US012396602B2

(12) United States Patent
Kataoka et al.

(10) Patent No.: US 12,396,602 B2
(45) Date of Patent: Aug. 26, 2025

(54) DUST REMOVAL DEVICE AND DUST REMOVAL METHOD

(71) Applicant: Hugle Development Inc., Tokyo (JP)

(72) Inventors: Yoshihiko Kataoka, Tokyo (JP); Tomohiro Shirane, Tokyo (JP)

(73) Assignee: Hugle Development Inc., Tokyo (JP)

( * ) Notice: Subject to any disclaimer, the term of this patent is extended or adjusted under 35 U.S.C. 154(b) by 69 days.

(21) Appl. No.: 18/247,317

(22) PCT Filed: Aug. 20, 2021

(86) PCT No.: PCT/JP2021/030511
§ 371 (c)(1),
(2) Date: Mar. 30, 2023

(87) PCT Pub. No.: WO2022/070663
PCT Pub. Date: Apr. 7, 2022

(65) Prior Publication Data
US 2023/0380644 A1 Nov. 30, 2023

(30) Foreign Application Priority Data

Sep. 30, 2020 (JP) ................................. 2020-164827

(51) Int. Cl.
A47L 5/14 (2006.01)
A47L 7/00 (2006.01)
(Continued)

(52) U.S. Cl.
CPC ............... A47L 5/14 (2013.01); A47L 7/0047 (2013.01); A47L 9/02 (2013.01); B08B 5/023 (2013.01);
(Continued)

(58) Field of Classification Search
CPC . A47L 5/14; A47L 7/0047; A47L 9/02; B08B 5/023; B08B 5/043; B08B 11/00;
(Continued)

(56) References Cited

U.S. PATENT DOCUMENTS 5,596,783 A * 1/1997 Testone ................. B41F 23/002
15/309.1
6,921,438 B2 * 7/2005 Lausevic ................... A47L 9/02
134/21

(Continued)

FOREIGN PATENT DOCUMENTS

| JP | H5-138136 A | 6/1993 | |
| JP | 2004041851 A * | 2/2004 | |
| JP | 2014100622 A * | 6/2014 | ............ B08B 15/04 |

OTHER PUBLICATIONS

Machine translation of JP-2004041851-A (Year: 2004).*
Machine translation of JP-2014100622-A (Year: 2014).*

Primary Examiner — Erin F Bergner
(74) Attorney, Agent, or Firm — Muncy, Geissler, Olds & Lowe, P.C.

(57) ABSTRACT

A dust removal device capable of normally dedusting a surface of a sheet-shaped object having an edge portion of a shape with protruding parts continuously arranged at predetermined intervals along the longitudinal direction, that is, a dust removal device discharging a gas to a surface of a sheet-shaped object 100 from a discharge outlet while drawing in the gas above the surface of the sheet-shaped object 100 through a suction inlet, the discharge outlet including a first discharge outlet 30 for discharging the gas to portions of the sheet-shaped object 100 other than the edge portion and a second discharge outlet 35 for discharging the gas to the edge portion 100b of the sheet-shaped object 10, and the suction inlet including a first suction inlet (31, 32) for drawing in the gas above the surface of the portions of the (Continued)

sheet-shaped object 100 other than the edge portion 100b and a second suction inlet (33, 34) for drawing in the gas of the surface of the edge portion 100b of the sheet-shaped object 100.

16 Claims, 22 Drawing Sheets

(51) Int. Cl.
  *A47L 9/02* (2006.01)
  *B08B 5/02* (2006.01)
  *B08B 5/04* (2006.01)
  *B08B 11/00* (2006.01)
  *H01M 4/04* (2006.01)
(52) U.S. Cl.
  CPC .............. *B08B 5/043* (2013.01); *B08B 11/00* (2013.01); *H01M 4/04* (2013.01)
(58) Field of Classification Search
  CPC .......... B08B 5/046; B08B 5/026; H01M 4/04; Y02E 60/10; Y02P 70/50
  See application file for complete search history.

(56) References Cited

U.S. PATENT DOCUMENTS

| | | | |
|---|---|---|---|
| 7,111,797 B2* | 9/2006 | Bezama | ............ H01L 21/67028 |
| | | | 15/345 |
| 2004/0003475 A1* | 1/2004 | Mariani | .................. B08B 15/04 |
| | | | 15/309.1 |

* cited by examiner

DUST REMOVAL DEVICE AND DUST REMOVAL METHOD

TECHNICAL FIELD

The present invention relates to a dust removal device and dust removal method for discharging a gas toward a surface of a sheet-shaped object being conveyed while drawing in the gas above the surface of the sheet-shaped object to thereby remove dust on the surface of the sheet-shaped object.

BACKGROUND ART

Known in the past has been the dust removal device described in PTL 1. This dust removal device is arranged facing a sheet-shaped object wound on a guide roll (support part) and conveyed by rotation of the guide roll at a part abutting against that guide roll. In this dust removal device, a slit-shaped discharge outlet and a suction inlet (opening of suction box) which extend in directions perpendicular to the direction of conveyance of the sheet-shaped object (width direction of the sheet-shaped object) are formed at a predetermined interval so that the discharge outlet is positioned at the upstream side from the suction inlet in the conveyance direction. Further, in the process of the sheet-shaped object being conveyed, the dust removal device discharges air from the discharge outlet to the surface of the sheet-shaped object while drawing in air above the surface of the sheet-shaped object through the suction inlet. Dust sticking to the surface of the sheet-shaped object is dislodged by the air discharged from the discharge outlet and becomes airborne, and the airborne dust is drawn in from the suction inlet with the air. Due to this, the dust sticking to the surface of the sheet-shaped object is removed (dedusted).

CITATIONS LIST

Patent Literature

PTL 1: Japanese Patent Publication No. H5-138136

SUMMARY

Technical Problem

In this regard, for example, at the time of the production of secondary batteries (lithium ion batteries etc.), a sheet-shaped object 100 configured as an electrode film such as shown in FIG. 1 (for example, aluminum film, copper film) is used. In this sheet-shaped object 100, an edge portion 100b continuing from a sheet body 100a in the width direction (traverse direction in FIG. 1) has a shape with a plurality of tabs 101 (protruding parts) jutting out in the width direction continuously arranged at predetermined intervals in the longitudinal direction. Two types of single electrode film pieces 110a, 110b are cut out for each tab 101 from this sheet-shaped object 100. Further, a predetermined number of these single electrode films 110a, 110b, as shown in FIG. 2, are alternately stacked across insulating films 111. Further, the final stack, as shown in FIG. 3, is formed as a battery unit 200 having two electrode blocks 210a, 210b comprised of stacked tabs 101.

In the above-described process of production of a battery unit 200, it is necessary to remove dust from the surface of the sheet-shaped object 100 (electrode film) used as the material. Therefore, the sheet-shaped object 100 may be dedusted by the above-mentioned conventional dust removal device.

However, if dedusting a sheet-shaped object 100 of the above-mentioned structure using the above-mentioned conventional dust removal device, the edge portion 100b of the sheet-shaped object 100 where the tabs 101 are arranged is not subjected to tension accompanying conveyance, so ends up flapping, bending, or being drawn into the suction inlet by the flow of the gas discharged from the discharge outlet or the flow of the gas being drawn through the suction inlet. As a result, the surface of the edge portion 100b of the sheet-shaped object 100 cannot be normally dedusted.

The present invention was made in consideration of these circumstances and provides a dust removal device capable of normally dedusting the surface of a sheet-shaped object having an edge portion of a shape with protruding parts continuously arranged at certain intervals along the longitudinal direction.

Solution to Problem

The dust removal device according to the present invention is a dust removal device that is provided with a discharge outlet and suction inlet facing the surface of a sheet-shaped object being conveyed and arranged at a predetermined interval along the conveyance direction of the sheet-shaped object and that discharges a gas from the discharge outlet to the surface of the sheet-shaped object while drawing in the gas above the surface of the sheet-shaped object through the suction inlet, wherein the discharge outlet includes a first discharge outlet which discharges the gas to a portion of the sheet-shaped object other than an edge portion in the width direction and a second discharge outlet which discharges the gas to the edge portion of the sheet-shaped object, and the suction inlet includes a first suction inlet which draws in the gas above the surface of the portion of the sheet-shaped object other than the edge portion and a second suction inlet which draws in the gas above the surface of the edge portion of the sheet-shaped object.

According to this configuration, in the process of the sheet-shaped object being conveyed, the gas discharged from the first discharge outlet is blown to the portion of the sheet-shaped object other than the edge portion, and the gas discharged from the second discharge outlet is blown to the edge portion. At this time, the gas above the surface of the portion of the sheet-shaped object other than the edge portion is drawn in through the first suction inlet, and the gas above the surface of the edge portion is drawn in through the second suction inlet. In this way, the gas is blown out from different discharge outlets to the edge portion of the sheet-shaped object and the other portion while the gas above the surface of the edge portion of the sheet-shaped object and above the surface of the other portion is drawn in through different suction inlets, so it is possible for the gas to be blown to the edge portion of the sheet-shaped object at a strength suitable for the form of the edge portion and different from that of the other portion and for the gas to be drawn in from above the surface of the edge portion of the sheet-shaped object at a strength suitable for the form of the edge portion and different from that above the surface of the other portion.

The dust removal device according to the present invention can be configured so that a supply path for the gas discharged from the first discharge outlet and a supply path for the gas discharged from the second discharge outlet differ.

Due to this configuration, the gas supplied from different supply paths is discharged from the first discharge outlet and the second discharge outlet and respectively blown to the edge portion of the sheet-shaped object and the other portion. Due to this, the gas can be easily blown to the edge portion of the sheet-shaped object at a strength suitable for the form of the edge portion and different from that of the other portion.

The dust removal device according to the present invention can be configured so that the opening area per unit length of the second discharge outlet is smaller than the opening area per unit length of the first discharge outlet.

Due to this configuration, the gas can be blown to the edge portion of the sheet-shaped object in a weaker manner than to the other portion in the process of the sheet-shaped object being conveyed.

The dust removal device according to the present invention can be configured so that the second discharge outlet includes a plurality of small holes aligned in a direction traversing the conveyance direction of the sheet-shaped object.

Due to this configuration, the gas can be discharged from the second discharge outlet in a weaker manner in comparison with the case of extending in a slit shape.

The dust removal device according to the present invention can be configured so as to have a gas discharge path with a shape that gradually expands from an opening facing the sheet-shaped object being conveyed to the second discharge outlet.

Due to this configuration, the gas passes through the gas discharge path which gradually expands from the opening and is discharged from the second discharge outlet. The discharge pressure of the gas running from the opening along the inner peripheral wall of the gas discharge path and discharged from the peripheral edge portion of the second discharge outlet becomes smaller than the discharge pressure of the gas directly discharged from the portion of the second discharge outlet facing the opening without running along the inner peripheral wall of the gas discharge path. Due to this, the discharge pressure of the gas discharged from the portion of the discharge outlet facing the opening can be kept at a desired pressure while lowering the discharge pressure of the gas discharged from the peripheral edge portion of the second discharge outlet. Due to the discharge pressure of the gas discharged from the peripheral edge portion of the second discharge outlet decreasing, a negative pressure state caused by the Bernoulli effect becomes difficult to produced at a region facing the peripheral edge portion of the second discharge outlet. Therefore, the edge portion of the sheet-shaped object being conveyed can be kept from flipping up due to a negative pressure state which could be produced by the Bernoulli effect when entering a region facing the peripheral edge portion of the second discharge outlet while dust sticking to the edge portion of the sheet-shaped object being conveyed can be reliably removed by the gas of the desired discharge pressure discharged from the portion of the second discharge outlet facing the opening.

The dust removal device according to the present invention can be configured so that a cross-section of the gas discharge path vertical to the sheet-shaped object being conveyed has a shape which gradually expands in an arc shape.

Due to this configuration, the gas runs along the inner peripheral wall of the gas discharge path with an arc-shaped cross-section gradually expanding from the opening and is discharged from the peripheral edge portion of the second discharge outlet and also is directly discharged from the portion of the second discharge outlet facing the opening. Due to this, as described earlier, the discharge pressure of the gas discharged from the portion of the second discharge outlet facing the opening can be kept at a desired pressure while lowering the discharge pressure of the gas discharged from the peripheral edge portion of the second discharge outlet.

The dust removal device according to the present invention can be configured so that the second discharge outlet includes a plurality of slits which are arranged in a direction traversing the conveyance direction of the sheet-shaped object with each slit extending in a direction traversing the arrangement direction, and the dust removal device having a gas discharge path which is provided for each of the plurality of slits and extends from an opening facing the sheet-shaped object to the slit, and wherein a cross-section of the gas discharge path taken vertical to each slit has a shape which gradually expands from the opening to the slit.

Due to this configuration, the gas runs from the opening through the gas discharge path gradually expanding from the opening, and is discharged from each of the plurality of slits. The discharge pressure of the gas running from the opening along the inner peripheral wall of the gas discharge path and discharged from the upstream end part of the slit in the conveyance direction of the conveyed sheet-shaped object is lower than the discharge pressure of the gas directly discharged from the portion of the slit facing the opening without running along the inner peripheral wall of the gas discharge path. Due to this, the discharge pressure of the gas discharged from a portion of each slit facing the opening can be kept at a desired pressure while the discharge pressure of the gas discharged from the upstream end part of the slit decreases. Due to the discharge pressure of the gas discharged from the upstream end part of each slit decreasing, a negative pressure state caused by the Bernoulli effect becomes difficult to produce at the region facing the upstream end part of the slit. Therefore, the edge portion of the sheet-shaped object being conveyed can be kept from flipping up due to a negative pressure state which could be produced by the Bernoulli effect when entering the region facing the upstream end part of each slit while dust sticking to the edge portion of the sheet-shaped object being conveyed can be reliably removed by the gas of the desired discharge pressure discharged from the portion of each slit facing the opening.

Further, when the edge portion of the sheet-shaped object being conveyed enters the region facing the upstream end parts of the plurality of slits, the gas of a certain discharge pressure is discretely blown to the edge portion of the sheet-shaped object from the plurality of slits. For this reason, when the edge portion of the sheet-shaped object enters the region facing the upstream end parts of the plurality of slits in the conveyance direction, discharged air will not act simultaneously on all of the front end portion of the edge portion. Accordingly, in the state where air of the desired discharge pressure is discharged from the portions of the slits facing the openings, the edge portion of the sheet-shaped object can be reliably kept from flipping up due to air acting on the edge portion.

The dust removal device according to the present invention can be configured so that the shape of the cross-section gradually expands to in an arc shape.

Due to this configuration, the gas runs from the opening along an inner peripheral wall of the gas discharge path with gradually expanding arc-shaped cross-section gradually expanding from the opening and is discharged from the upstream end part of each slit in the conveyance direction of the sheet-shaped object being conveyed and is also directly discharged from the portion of the slit facing the opening without running along the inside peripheral wall of the gas discharge path. Due to this, as explained above, the discharge pressure of the gas discharged from the portion of each slit facing the opening can be kept at a desired pressure while the discharge pressure of the gas discharged from the upstream end part of the slit decreases.

The dust removal device according to the present invention can be configured so that each of the plurality of slits is formed inclining obliquely to the conveyance direction of the sheet-shaped object.

Due to this configuration, the gas can be blown from a plurality of discretely arranged slits during conveyance of the sheet-shaped object not simply in the form of a plurality of lines but over a wider area on the sheet-shaped object than the edge portion.

The dust removal device according to the present invention can be configured so that each of the plurality of slits is formed in a state overlapping the adjacent slit in view in the conveyance direction of the sheet-shaped object.

Due to this configuration, the gas can be blown with no gaps to the edge portion of the sheet-shaped object from the plurality of discretely arranged slits during conveyance of the sheet-shaped object.

The dust removal device according to the present invention can be configured so that the plurality of slits are arranged in parallel or arranged zig-zag in a direction traversing the conveyance direction of the sheet-shaped object.

The dust removal device according to the present invention can be configured so that the opening area per unit length of the second suction inlet is smaller than the opening area per unit length of the first suction inlet.

Due to this configuration, the gas can be drawn in from above the surface of the edge portion of the sheet-shaped object in the process of conveyance of the sheet-shaped object in a weaker manner than that above the surface of the other portions.

The dust removal device according to the present invention can be configured so that the second suction inlet includes a plurality of small holes aligned in a direction traversing the conveyance direction of the sheet-shaped object.

Due to this configuration, the gas can be drawn in through the second suction inlet in a weaker manner than if formed extending in a slit shape or extending in an elongated rectangular shape.

A dust removal method for dedusting a sheet-shaped object having an edge portion with a shape with protruding parts continuously arranged at certain intervals in the longitudinal direction, the method using a dust removal device which is provided with a discharge outlet and suction inlet arranged facing the surface of the sheet-shaped object being conveyed and extending in a direction traversing the conveyance direction of the sheet-shaped object at a predetermined interval in the conveyance direction of the sheet-shaped object, and the method comprising a flow generation step of discharging a gas from the discharge outlet to the surface of the sheet-shaped object while drawing in a gas above the surface of the sheet-shaped object through the suction inlet, where, in the flow generation step, the discharge of the gas from the discharge outlet is weaker on the edge portion of the sheet-shaped object than portions of the sheet-shaped object other than the edge portion, and the suction of the gas through the suction inlet is weaker on the surface of the edge portion than on the surface of portions of the sheet-shaped object other than the edge portion.

Due to this configuration, in the process of conveyance of the sheet-shaped object, at an edge portion of a sheet-shaped object with a shape with protruding parts continuously arranged at certain intervals along the conveyance direction, the surface of a sheet-shaped object is dedusted by blowing a gas in a weaker manner compared to that of the other portions and drawing in the gas from above the surface of the edge portion in a weaker manner than that above the surface of the other portions. Due to this, the protruding parts can be kept from bending or being damaged during dedusting of the surface of the sheet-shaped object due to the being blown or drawn in.

Advantageous Effects of Invention

According to the dust removal device according to the present invention, when blowing a gas on a surface of a sheet-shaped object being conveyed and drawing in the gas above the surface so as to dedust the surface of the sheet-shaped object, the gas can be blown on the edge portion of the sheet-shaped object at a strength appropriate for the form of the edge portion and different from that of the other portions, and the gas can be drawn in from above the surface of the edge portion of the sheet-shaped object at a strength appropriate for the form of the edge portion and different from that of the other portions. For this reason, when a sheet-shaped object having an edge portion with a shape with protruding parts continuously arranged at certain intervals along the longitudinal direction is being conveyed in the longitudinal direction while the surface of the sheet-shaped object is being dedusted, the protruding parts of the edge portion can be kept from bending or being damaged due to the gas discharged from the discharge outlets or the gas being drawn in through the suction inlets, and the surface of the sheet-shaped object having an edge portion with a shape with protruding parts continuously arranged at certain intervals along the longitudinal direction can be properly dedusted.

According to the dust removal device and dust removal method according to the present invention, when a sheet-shaped object having an edge portion with a shape with protruding parts continuously arranged at certain intervals along the longitudinal direction is being conveyed in the longitudinal direction while the surface of the sheet-shaped object is being dedusted, a gas is blown to the edge portion of the sheet-shaped object in a weaker manner than the other portions, and the gas is drawn in from above the surface of the edge portion in a weaker manner than above the surface of the other portions. Due to this, the protruding parts can be kept from bending or being damaged due to the gas being blown or being drawn in during dedusting of the surface of the sheet-shaped object, and the surface of the sheet-shaped object having an edge portion with a shape with protruding parts continuously arranged at certain intervals along the longitudinal direction can be normally dedusted.

DESCRIPTION OF EMBODIMENTS

Below, embodiments of the present invention will be explained using the drawings.

Figure 4:
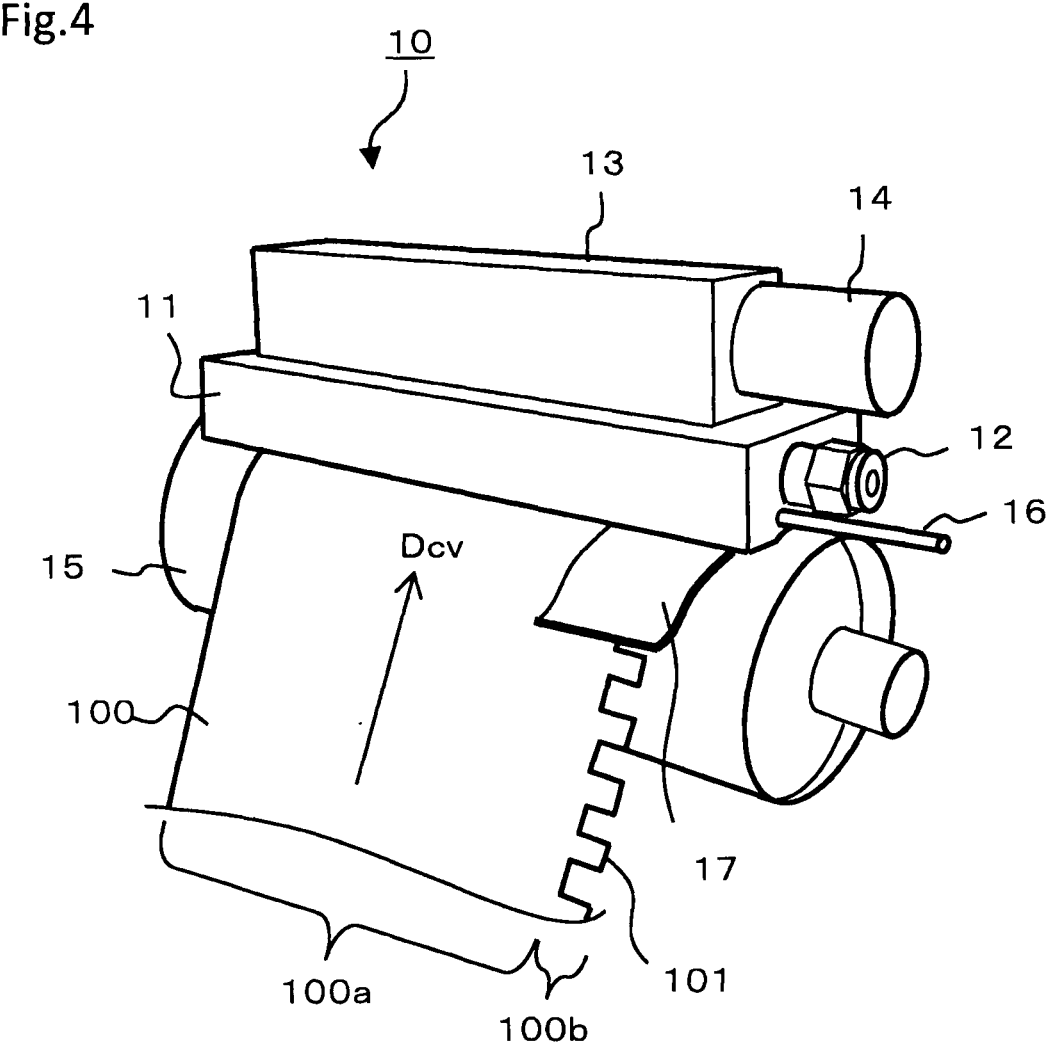
FIG. 4 is a perspective view showing a dust removal device according to a first embodiment of the present invention.
Figure 5:
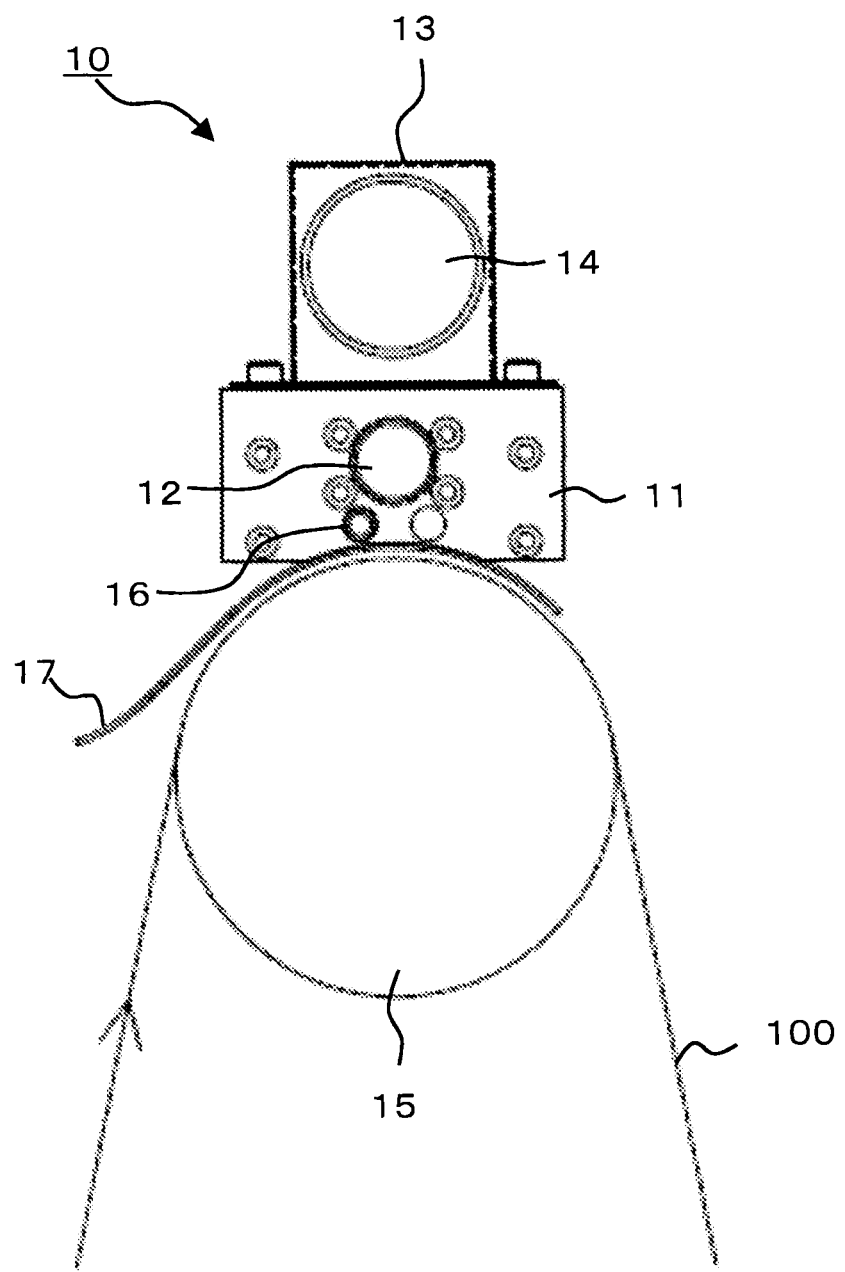
FIG. 5 is a side view showing the dust removal device according to the first embodiment of the present invention.
Figure 6:
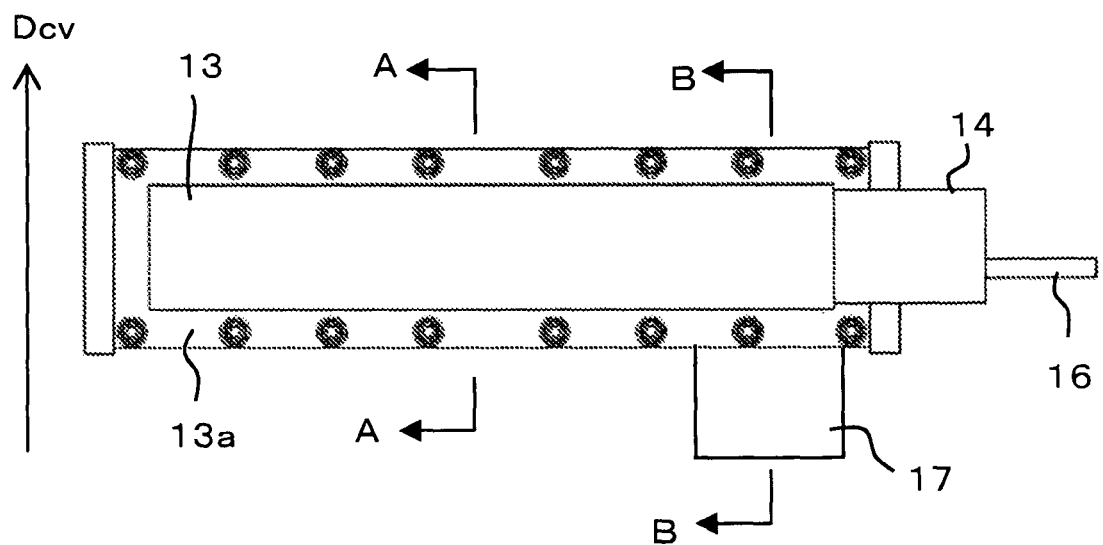
FIG. 6 is a plan view showing the dust removal device according to the first embodiment of the present invention.
Figure 7:
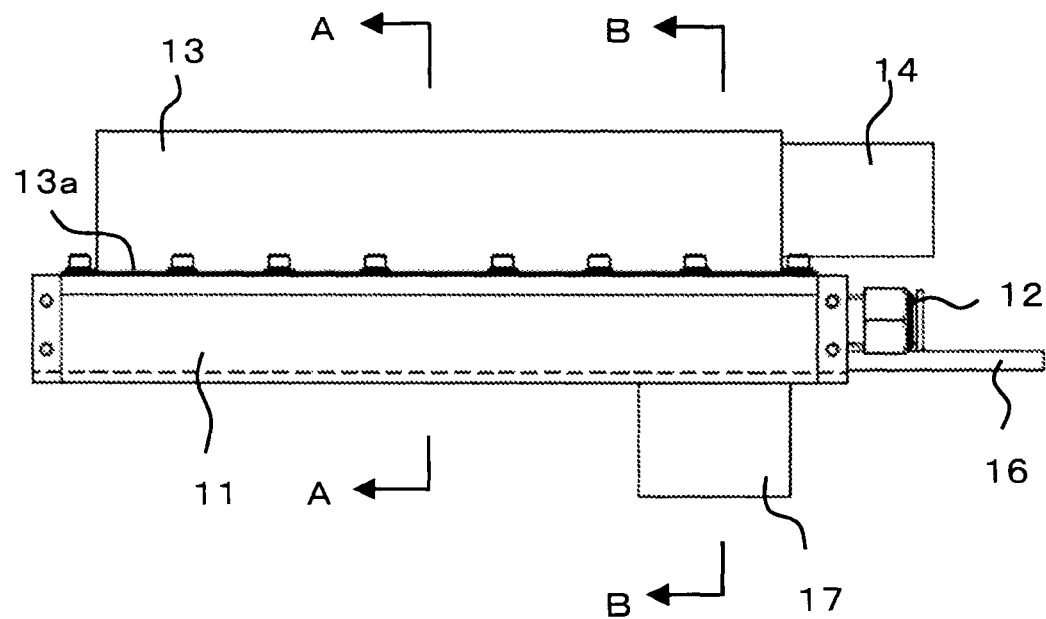
FIG. 7 is a front view showing the dust removal device according to the first embodiment of the present invention.
Figure 8:
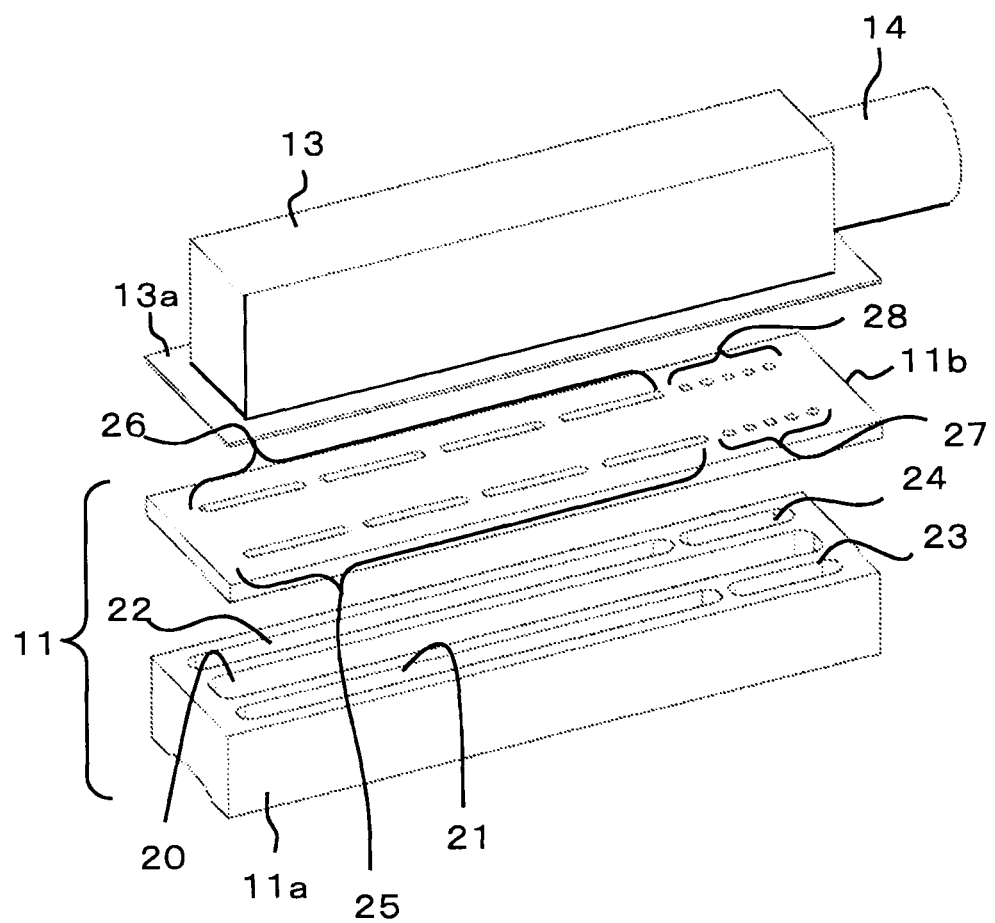
FIG. 8 is a (first) disassembled perspective view showing the structure of the dust removal device according to the first embodiment of the present invention.
Figure 9:
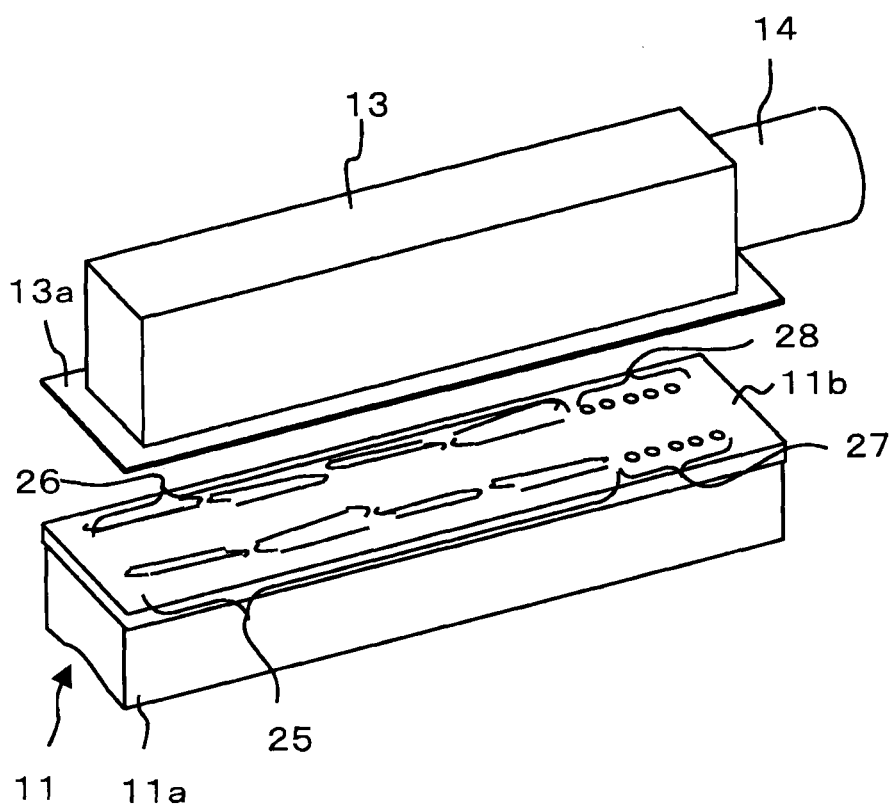
FIG. 9 is a (second) disassembled perspective view showing the structure of the dust removal device according to the first embodiment of the present invention.
Figure 10:
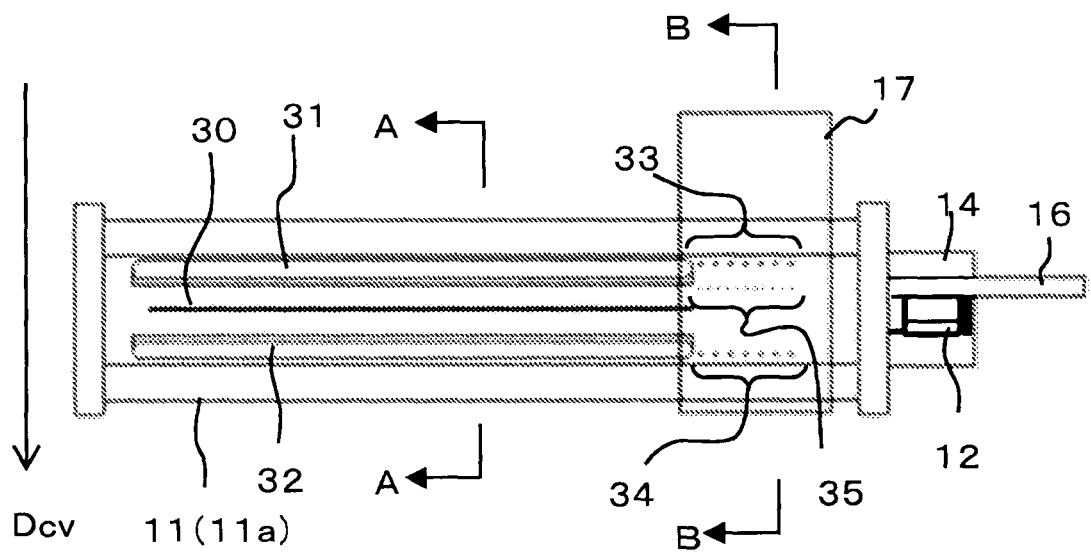
FIG. 10 is a bottom view showing the dust removal device according to the first embodiment of the present invention.
Figure 11:
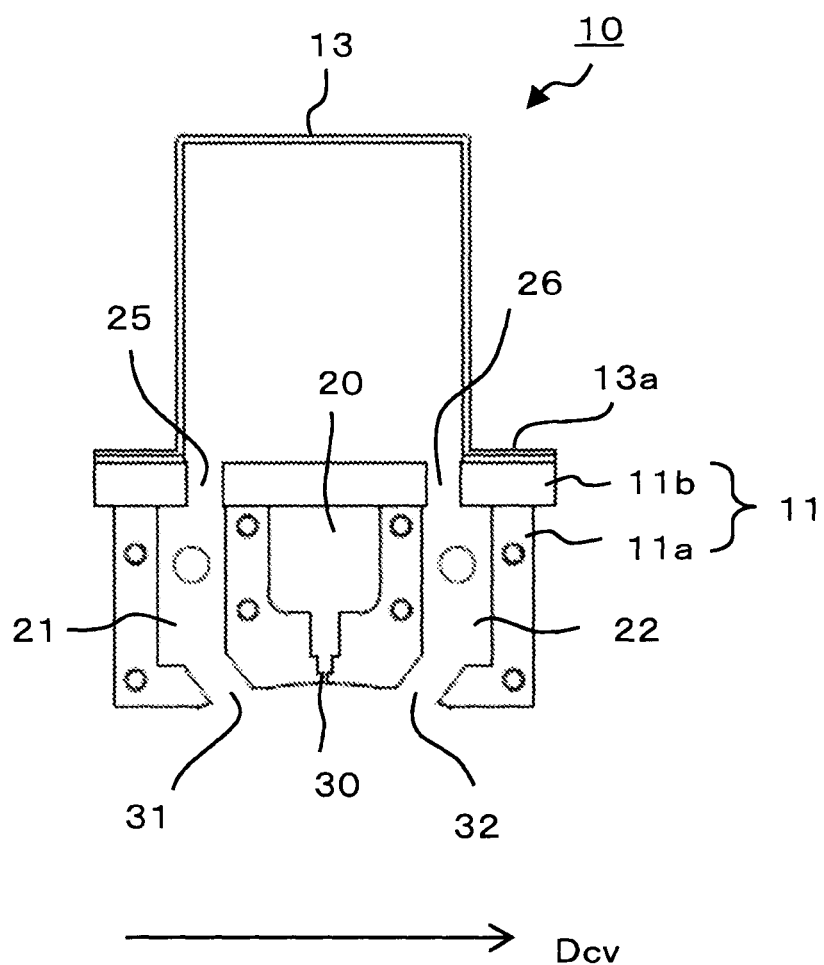
FIG. 11 is a cross-sectional view showing a cross-section of the dust removal device taken along the A-A line in FIG. 6, FIG. 7, and FIG. 10.
Figure 12:
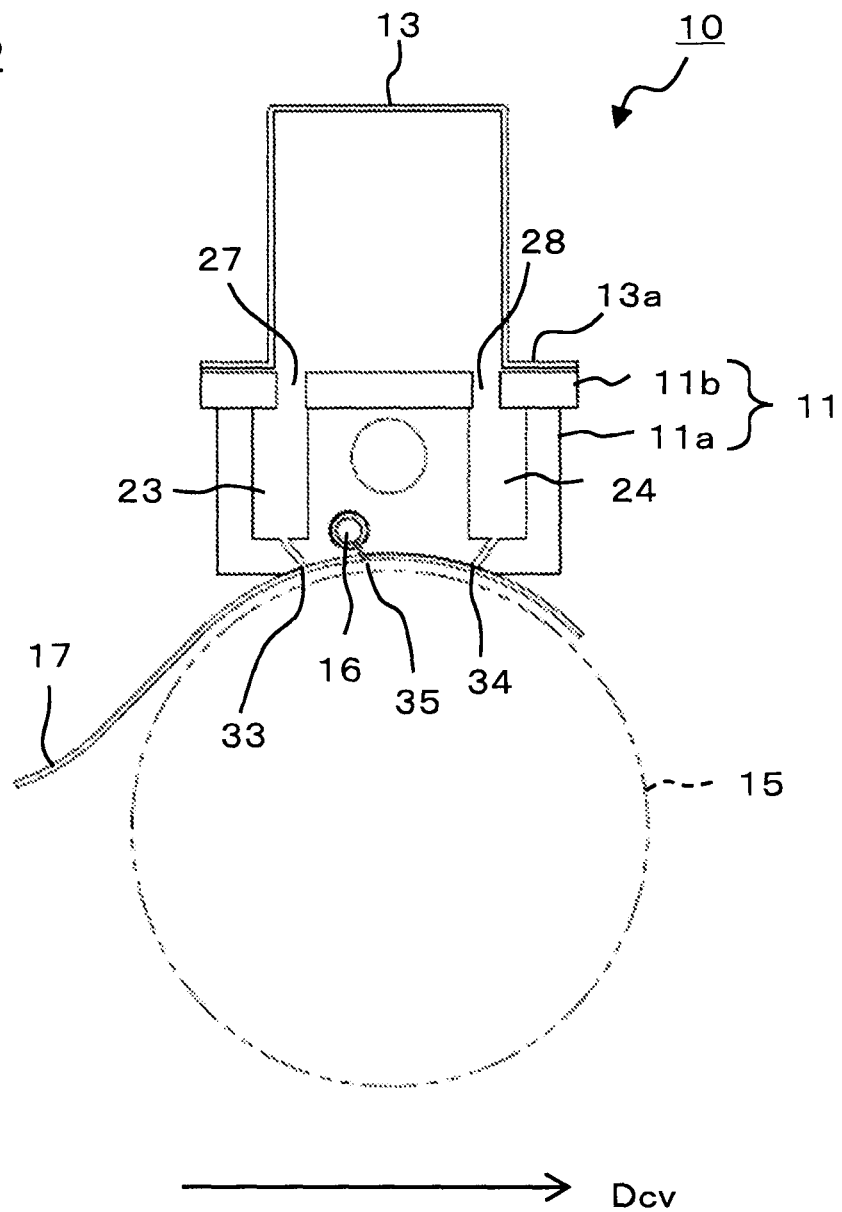
FIG. 12 is a cross-sectional view showing a cross-section of the dust removal device taken along the B-B line in FIG. 6, FIG. 7, and FIG. 10.
Figure 13:
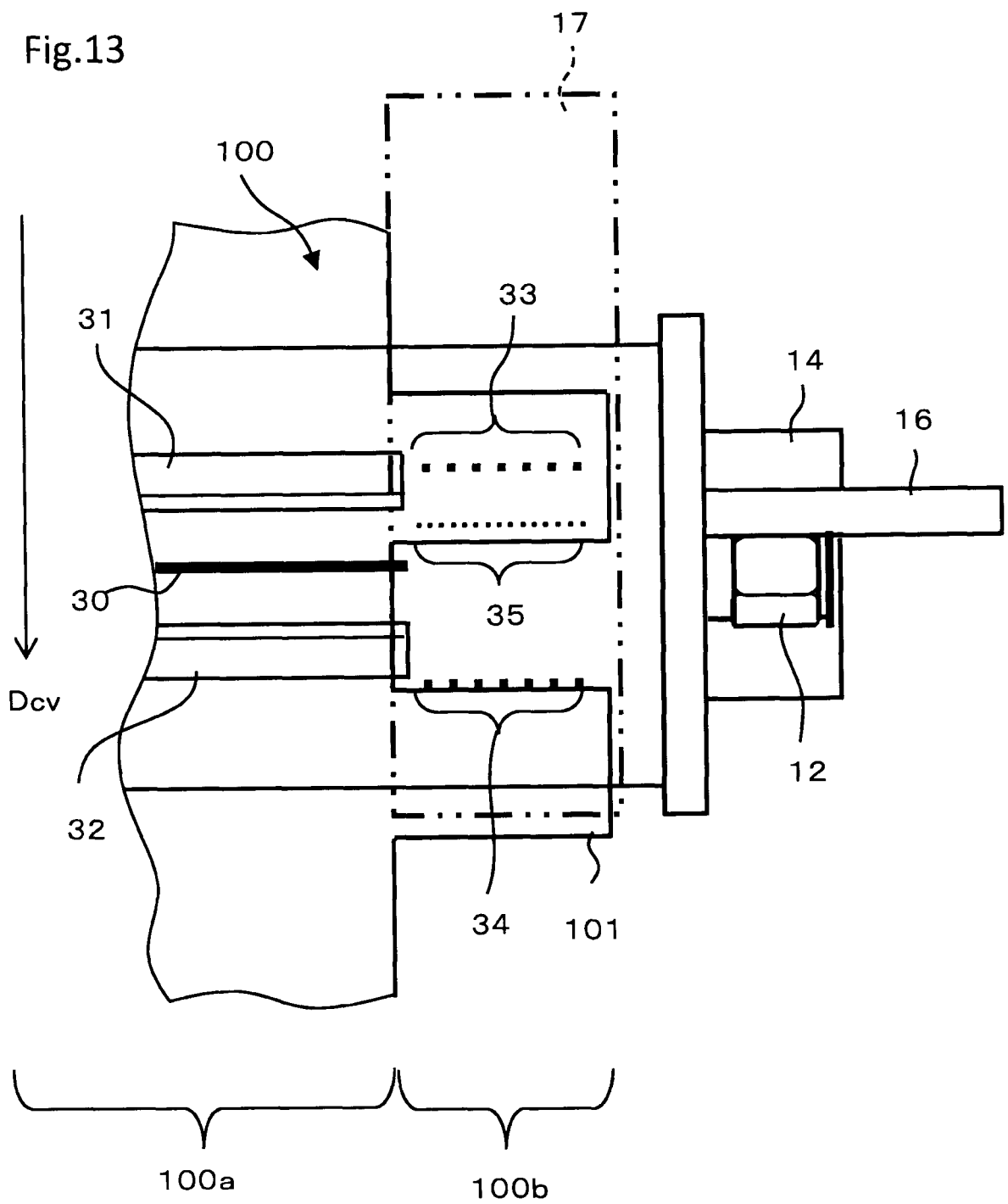
FIG. 13 is a view showing enlarged a relative positional relationship between the sheet-shaped object being dedusted and the discharge outlets and suction inlets of the dust removal device.

A dust removal device according to a first embodiment of the present invention is shown in FIG. 4 to FIG. 13. Note that FIG. 4 is a perspective view showing the dust removal device, FIG. 5 is a side view showing the dust removal device, FIG. 6 is a plan view showing the dust removal device, and FIG. 7 is a front view showing the dust removal device. Further, FIG. 8 and FIG. 9 are respectively disassembled perspective views showing the dust removal device, and FIG. 10 is a bottom view showing the dust removal device. Moreover, FIG. 11 is a cross-sectional view showing a cross-section of the dust removal device taken along the A-A line in FIG. 6, FIG. 7, and FIG. 10, and FIG. 12 is a cross-sectional view showing a cross-section of the dust removal device taken along the B-B line in FIG. 6, FIG. 7, and FIG. 10. FIG. 13 is a view showing enlarged the relative positional relationship between the sheet-shaped object being dedusted and the discharge outlet and suction inlet of the dust removal device.

Figure 1:
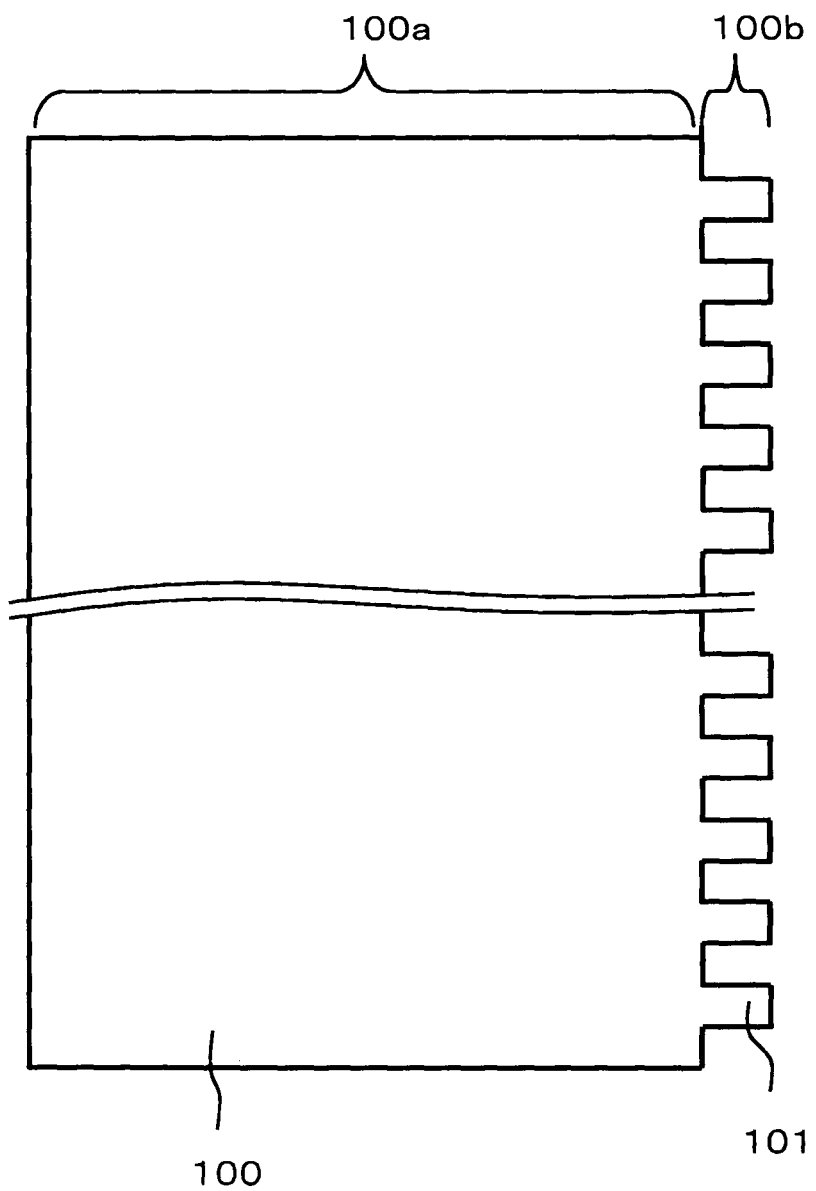
FIG. 1 is a view showing an electrode film as one example of a sheet-shaped object to be dedusted.
Figure 2:
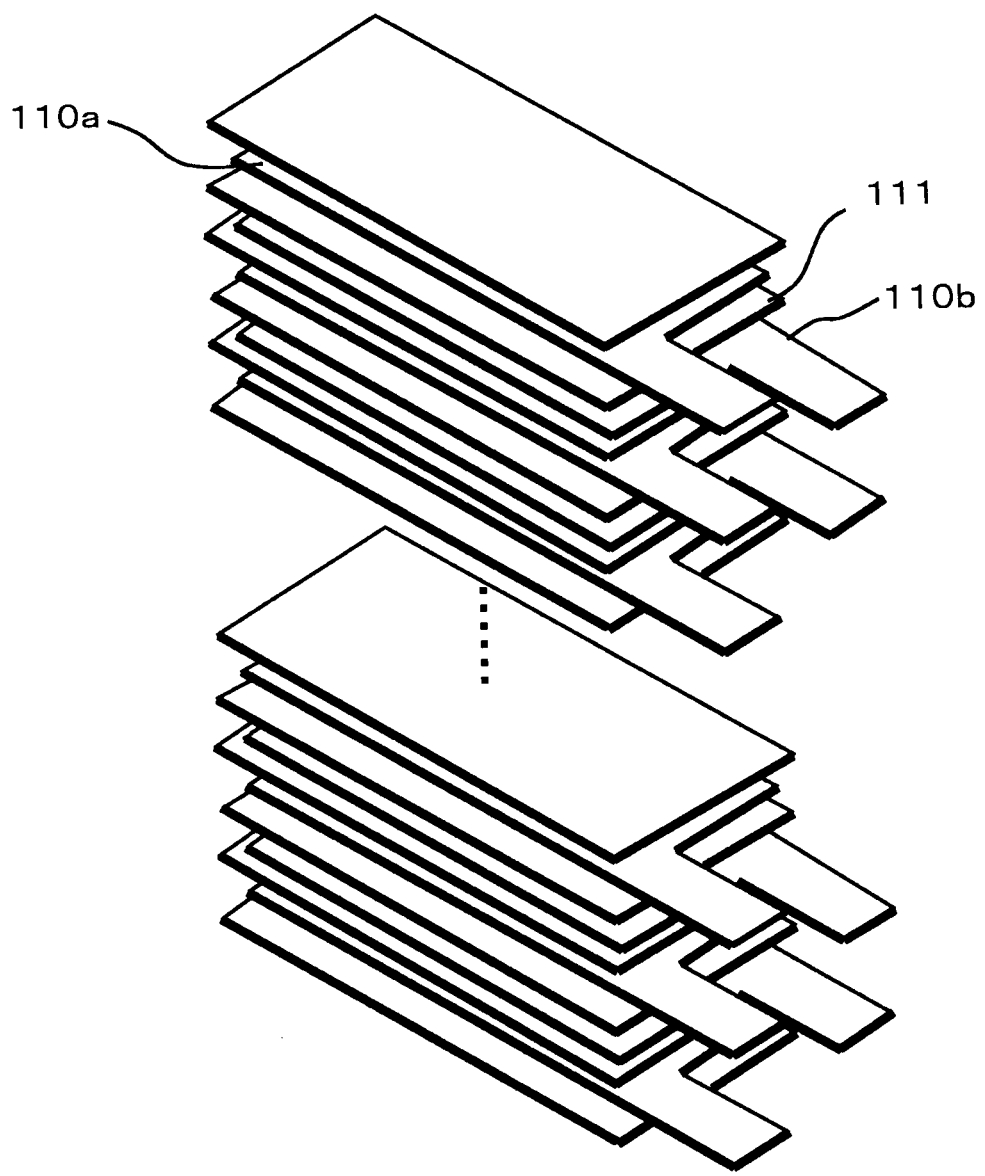
FIG. 2 is a view showing a stacked state of single electrode films cut out from the electrode film shown in FIG. 1.
Figure 3:
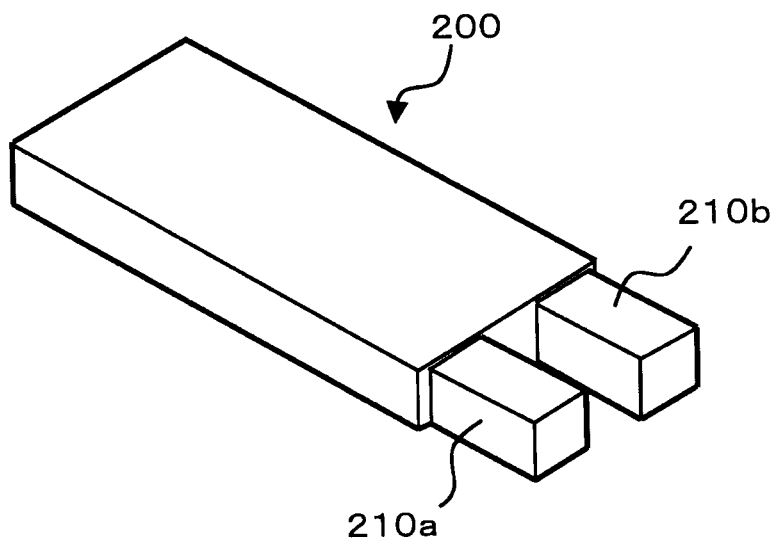
FIG. 3 is a view showing a battery unit formed from a plurality of the single electrode film pieces stacked as shown in FIG. 2.

In FIG. 4 and FIG. 5, the sheet-shaped object 100 to be dedusted is wound over a conveyance roller 15 serving as a support part and conveyed in the longitudinal direction (conveyance direction Dcv) by rotation of the conveyance roller in a stretched state in which tension is applied. This sheet-shaped object 100 is, for example, an electrode film used in the production of a secondary battery in the same way as the above-described example (see FIG. 1 to FIG. 3). The shape of the edge portion 100b continuing from the sheet body 100a in the width direction is one where a plurality of tabs 101 (protruding parts) are continuously arranged at predetermined intervals along the longitudinal direction. Note that no tension is applied to the tabs 101 (edge portion 100b) of the sheet-shaped object 10 conveyed by the conveyance roller 15.

The dust removal device 10 is arranged facing the surface of the sheet-shaped object 100 wound over the conveyance roller 15 (see FIG. 4 and FIG. 5). Further, as shown in FIG. 6 and FIG. 7 together with FIG. 4 and FIG. 5, the dust removal device 10 is provided with an elongated block-shaped dedusting head 11 which extends in the rotational axis direction of the conveyance roller (the width direction of the sheet-shaped object 100, a direction perpendicular to the conveyance direction Dcv of the sheet-shaped object 100, and the traverse direction in FIG. 6 and FIG. 7) and an exhaust duct unit 13 which extends along the upper surface of the dedusting head 11. The exhaust duct unit 13 has a bottom which is open and a flange 13a which is formed at the opening edge portion. The flange 13a of the exhaust duct unit 13 is fastened to the upper surface of the dedusting head 11 by a plurality of bolts, whereby the dedusting unit 11 and the exhaust duct unit 13 are integrally joined and the inside of the exhaust duct unit 13 is formed with a space serving as an exhaust path. An exhaust port 14 is provided on a side surface of the exhaust duct unit 13. The exhaust port 14 is connected to a suction mechanism (for example, a vacuum pump: not shown). By operation of the suction mechanism, air passing through the exhaust path of the exhaust duct unit 13 is discharged to the outside through the exhaust port 14.

A supply port 12 is provided at a side surface of the dedusting head 11. The supply port 12 connects to a supply mechanism for supplying pressurized air (for example, a pressurizing pump: not shown). By operation of the supply mechanism, pressurized air is introduced into the dedusting head 11 (later explained ejection chamber 20) through the supply port 12. Further, the dedusting head 11 is provided with a supply pipe 16 which is inserted from the side surface. The supply pipe 16 is also connected to an outside supply mechanism (not shown). Pressurized air is introduced by operation of the supply mechanism. Note that the supply mechanism which is connected to the supply port 12 and the supply mechanism which is connected to the supply pipe 16 may be the same or may be different. At the surface of the dedusting head 11 facing the conveyance roller 15, a guide plate 17 (sheet pressing mechanism) is fixed so as to press the edge portion 100b of the sheet-shaped object 100 at which the tabs 101 are formed toward the conveyance roller 15 (support part) so as to guide the edge portion 100b along the conveyance roller 15.

The dedusting head 11, as shown in FIG. 8 and FIG. 9 together with FIG. 4 to FIG. 7, has a structure where a head block 11a and a suction regulating plate 11b are superposed. The head block 11a is formed with, as spaces opening at the surface joined to the suction regulating plate 11b, an ejection chamber 20, front side first air suction chamber 21, rear side first air suction chamber 22, front side second air suction chamber 23, and rear side second air suction chamber 24. The air ejection chamber 20 extends in the longitudinal direction at the center of the head block 11a in the width direction. The front side first air suction chamber 21 and front side second air suction chamber 23 which extend in the longitudinal direction of the head block 11a are arranged aligned along the front side edge of the head block 11a (corresponding to the upstream side of the sheet-shaped object 100 in the conveyance direction Dcv). The rear side first air suction chamber 22 and rear side second air suction chamber 24 which extend in the longitudinal direction of the head block 11a are arranged aligned along the rear side edge of the head block 11a (corresponding to the downstream side of the sheet-shaped object 100 in the conveyance direction Dcv). The front side second air suction chamber 23 and rear side second air suction chamber 24 are respectively shorter than the front side first air suction chamber 21 and the rear side first air suction chamber 22. Their lengths generally correspond to the width of the edge portion 100b of the sheet-shaped object 100 to be dedusted on which the tabs 101 are formed (see FIG. 1). Further, the lengths of the front side first air suction chamber 21 and the rear side first air suction chamber 22 generally correspond to the width of the sheet body 100a of the sheet-shaped object 100 (see FIG. 1).

At the suction regulating plate 11b, respectively passing through the same, front side first suction regulating holes 25 and rear side first suction regulating holes 26 constituted by pluralities of elongated holes and front side second suction regulating holes 27 and rear side second suction regulating holes 28 constituted by pluralities of small holes are formed. In addition, the total opening areas of the front side second suction regulating holes 27 and the rear side second suction regulating holes 28 are smaller than the total opening areas of the front side first suction regulating holes 25 and the rear side first suction regulating holes 26. The head block 11a and suction regulating plate 11b are fixed together in a superposed state by a plurality of bolts together with the above-described exhaust duct unit 13 (flange 13a). When the head block 11a and the suction regulating plate 11b are superposed in this way, the front side first air suction chamber 21 of the head block 11a and the front side first suction regulating holes 25 of the suction regulating plate 11b face each other, while the front side second air suction chamber 23 of the head block 11a and the front side second suction regulating holes 27 of the suction regulating plate 11b face each other. Further, the rear side first air suction chamber 22 of the head block 11a and the rear side first suction regulating holes 26 of the suction regulating plate 11b face each other, while the rear side second air suction chamber 24 of the head block 11a and the rear side second suction regulating holes 28 of the suction regulating plate 11b face each other. In addition, in the state where the head block 11a and the suction regulating plate 11b are superposed, the air ejection chamber 20 of the head block 11a is closed by the suction regulating plate 11b.

As shown in FIG. 10 together with FIG. 4 to FIG. 9, the surface of the dedusting head 11 (head block 11a) facing the conveyance roller 15 is formed with a slit-shaped first discharge outlet 30 extending in the longitudinal direction at the center in the width direction. Further, the surface is formed with an elongated rectangular front side first suction inlet 31 along the front side edge and is formed with an elongated rectangular rear side first suction inlet 32 along the rear side edge. In the state where the sheet-shaped object 100 is being conveyed by the conveyance roller 15, the first discharge outlet front side first suction inlet 31, and rear side first suction inlet 32 which are aligned at the dust removal device 10 in the conveyance direction Dcv at predetermined intervals face the sheet body 100a of the sheet-shaped object 100.

In addition, as shown in FIG. 11, the first discharge outlet 30 communicates with the air ejection chamber 20 formed on the head block 11a, and the pressurized air introduced from the supply port 12 to the air ejection chamber 20 (supply path for air) is discharged from the first discharge outlet 30. Further, the front side first suction inlet 31 communicates with the space in the exhaust duct unit 13 (exhaust path) through the front side first air suction chamber 21 formed on the head block 11a and the front side first suction regulating holes 25 formed on the suction regulating plate 11b. Further, the rear side first suction inlet 32 communicates with the space in the exhaust duct unit 13 through the rear side first suction chamber 22 formed at the head block 11a and the rear side first suction regulating holes 26 formed at the suction regulating plate 11b. Along with air passing through the exhaust path (space) in the exhaust duct unit 13 being discharged to the outside through the exhaust port 14, air is drawn in to the front side first suction inlet 31 and the rear side first suction inlet 32 which communicate with the space in the exhaust duct unit 13.

Returning to FIG. 10, at the guide plate 17 fixed to the surface of the dedusting head 11 (head block 11a) facing the conveyance roller 15, a front side second suction inlet 33 is formed aligned with the front side first suction inlet 31 in the longitudinal direction. The front side second suction inlet 33 is constituted by a plurality of small holes aligned on a straight line. The total opening area per unit length is smaller than the opening area per unit length of the front side first suction inlet 31. Further, at the guide plate 17, the rear side second suction inlet 34 is formed aligned with the rear side first suction inlet 32 in the longitudinal direction. The rear side second suction inlet 34 is constituted by a plurality of small holes aligned on a straight line in the same way as the front side second suction inlet 33. The total opening area per unit length is smaller than the opening area per unit length of the rear side first suction inlet 32.

In addition, as shown in FIG. 12, the front side second suction inlet 33 formed on the guide plate 17 communicates with the space in the exhaust duct unit 13 (exhaust path) through the front side second air suction chamber 23 formed on the head block 11a and the front side second suction regulating holes 27 formed on the suction regulating plate 11b. Further, the rear side second suction inlet 34 formed on the guide plate 17 communicates with the space in the exhaust duct unit 13 through the rear side second air suction chamber 24 formed on the head block 11a and the rear side second suction regulating holes 28 formed on the suction regulating plate 11b. Along with air passing through the space in the exhaust duct unit 13 (exhaust path) being discharged to the outside through the exhaust port 14, air is drawn in through the front side second suction inlet 33 and the rear side second suction inlet 34 which communicate with the space in the exhaust duct unit 13.

As shown in FIG. 10 and FIG. 12, the supply pipe 16 is inserted into the head block 11a of the dedusting head 11. The closed end reaches the vicinity of the edge of the guide plate 17. A second discharge outlet 35 is formed on the guide plate 17 at a predetermined position between the front side second suction inlet 33 and the rear side second suction inlet 34 but nearer to the front side second suction inlet 33 and parallel to the same. The second discharge outlet 35 is constituted by a plurality of small holes aligned on a straight line. The total opening area per unit length is smaller than the opening area per unit length of the first discharge outlet 30. In addition, the second discharge outlet 35 formed at the guide plate 17 communicates with the supply pipe 16 inserted in the head block 11a. The pressurized air introduced into the supply pipe 16 (other supply path for air) is discharged from the second discharge outlet 35.

The dust removal device 10 with the above-described structure dedusts the sheet-shaped object 100 in the following manner.

The sheet-shaped object 100 is conveyed by rotation of the conveyance roller 15 in a state in which a certain tension is applied to the sheet body 100a. When the sheet-shaped object 100 conveyed in this way passes through the dust removal device 10, as shown in FIG. 13 along with FIG. 4 and FIG. 5, the edge portion 100b of the sheet-shaped object 100 where tabs 101 are continuously arranged is guided by the guide plate 17 along the conveyance roller 15 and moved while being pressed down toward the conveyance roller 15.

In the dust removal device 10, due to the difference in the opening area per unit length of the first discharge outlet 30 and the second discharge outlet 35 and the difference in shape of the air ejection chamber 20 of the supply path to the first discharge outlet 30 and the supply pipe 16 of the air supply path to the second discharge outlet 35, the strength of air discharge from the second discharge outlet 35 is weaker than the strength of air discharge from the first discharge outlet 30. Further, due to the difference in the opening area per unit length of the front side first suction inlet 31 and rear side first suction inlet 32 and the front side second suction inlet 33 and rear side second suction inlet 34 and the difference in the opening area per unit length of the front side first suction regulating holes 25 and rear side first suction regulating holes 26 of the suction regulating plate 11b and the front side second suction regulating holes 27 and rear side second suction regulating holes 28, the strength of air suction through the front side second suction inlet 33 and the rear side second suction inlet 34 is weaker than the strength of air suction through the front side first suction inlet 31 and the rear side first suction inlet 32.

In addition, in the process of movement of the sheet-shaped object 100, air discharged in a comparatively strong manner from the first discharge outlet 30 of the dust removal device 10 is blown mainly to the surface of the sheet body 100a of the sheet-shaped object 100 while air above the surface of the sheet body 100a is drawn in through the front side first suction inlet 31 and rear side first suction inlet 32 in a comparatively strong manner (flow generation step). Dust dislodged mainly from the surface of the sheet body 100a by air from the first discharge outlet 30 is drawn in together with air through the front side first suction inlet 31 and rear side suction inlet 32. Due to this, mainly the surface of the sheet body 100a of the sheet-shaped object 100 is dedusted.

Further, the edge portion 100b of the sheet shape 100 which is pressed down toward the conveyance roller 15 and guided along the conveyance roller 15 by the guide plate 17 when the sheet-shaped object 100 is moving, as shown in FIG. 13, moves while facing the front side second suction inlet 33, second discharge outlet 35, and rear side second suction inlet 34. During this process, air discharged in a comparatively weak manner from the second discharge outlet 35 is blown to the surface of the edge portion 100b of the sheet-shaped object 100 while air above the surface of the edge portion 100b of the sheet-shaped object 100 is drawn in through the front side second suction inlet 33 and rear side second suction inlet 34 in a comparatively weak manner (flow generation step). The dust dislodged by air from the second discharge outlet 35 from the surfaces of the tabs 101 (edge portion 100b) of the sheet-shaped object 100 pressed down by the guide plate 17 is drawn in together with air through the front side second suction inlet 33 and rear side second suction inlet 34. Due to this, the surfaces of the tabs 101 (edge portion 100b) of the sheet-shaped object 100 are dedusted without the tabs flapping, bending, or being sucked into the suction inlets 33, 34.

According to the above-described dust removal device 10, it is possible to reliably dedust mainly the sheet body 100a of the sheet-shaped object 100 using air discharged in a relatively strong manner from the first discharge outlet 30 and comparatively strong suction of air through the front side first suction inlet 31 and rear side first suction inlet 32. On the other hand, the edge portion 100b of the sheet-shaped object 100, unlike the sheet body 100a, is subjected to air discharge and suction at a strength appropriate for the form of the edge portion 100b (form of arrangement of tabs 101 (protruding parts)), specifically, comparatively weak air discharge from the second discharge outlet and comparatively weak air suction through the front side second suction inlet 33 and rear side second suction inlet 34. This makes it possible to keep the tabs 101 of the edge portion 100b of the sheet-shaped object 100 from flapping, bending, or being sucked into the suction inlets. Further, because the edge portion 100b constituted by the continuous tabs 101 is guided along the conveyance roller 15 and pressed down toward the conveyance roller 15 by the guide plate 17 while the sheet-shaped object 100 is being conveyed, the tabs 101 of the edge portion 100b of the sheet-shaped object 100 are more reliably kept from flapping, bending, or being sucked into the suction inlets. The combination of the effects of an appropriate degree of air discharge and suction and the guide plate 17 pressing down on the conveyance roller 15 allows the edge portion 100b of the sheet-shaped object 100 to be reliably dedusted normally.

In the above-described dust removal device according to the first embodiment, two suction inlets (front side first suction inlet 31, rear side first suction inlet 32) are provided sandwiching the first discharge outlet 30, but the present invention is not limited to this. Just one suction inlet of these may be provided as well. Further, in such a case, either the front side second suction inlet 33 or the rear side second suction inlet 34 may be provided.

Note that the shapes of the second discharge outlet 35, front side second suction inlet 33, and rear side second suction inlet 34 are not limited to those described above. For example, these may be arranged in a non-parallel manner. Further, each may be constituted by a single hole, a plurality of small holes arranged in a separately dispersed manner, etc.

In the first embodiment described earlier, a guide plate 17 was provided, but the guide plate 17 may be omitted. In this case, for example, the embodiment is configured like the dust removal device according to a second embodiment.

Figure 14:
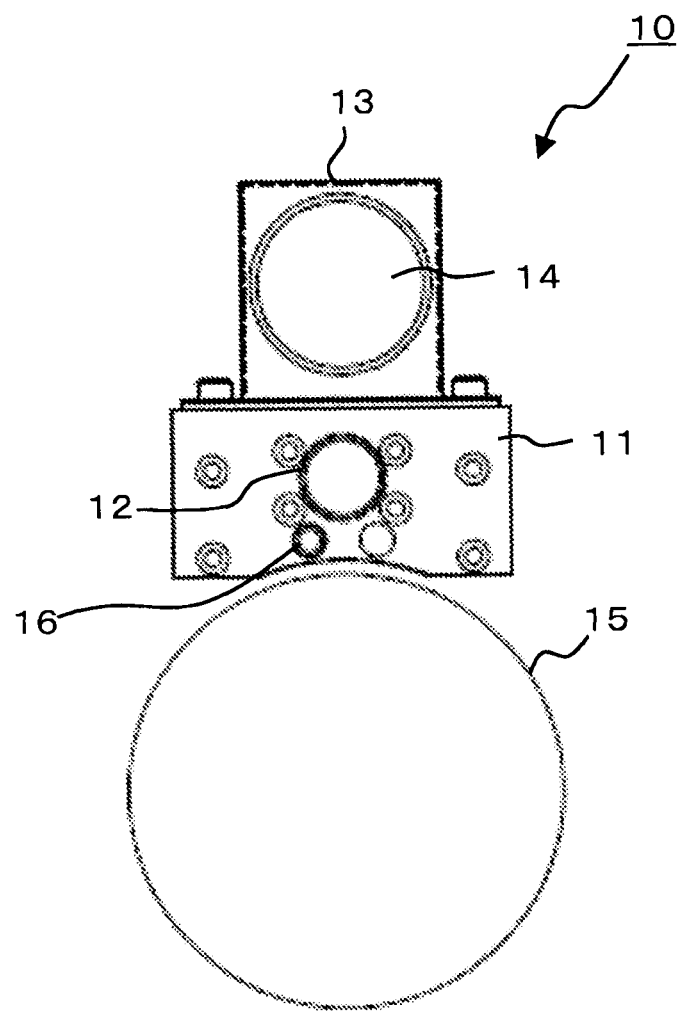
FIG. 14 is a side view showing a dust removal device according to a second embodiment of the present invention.
Figure 15:
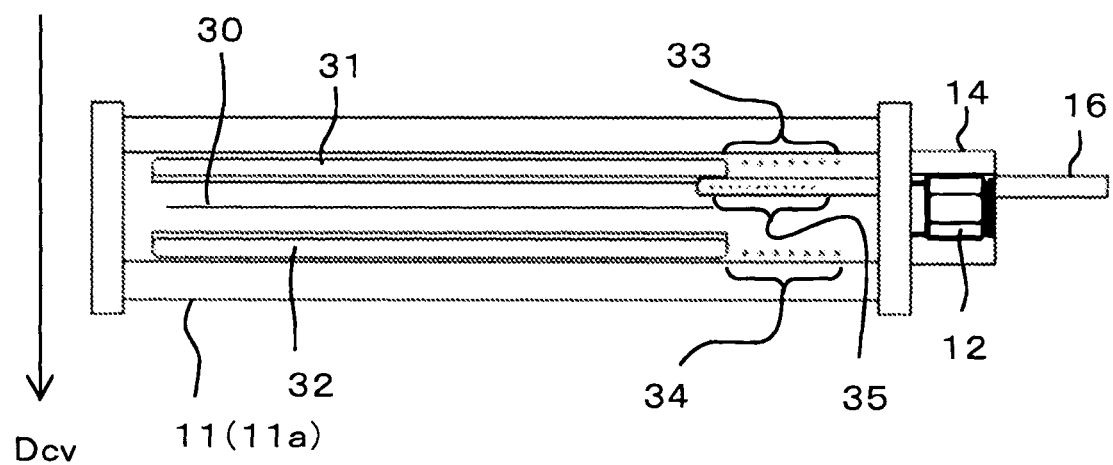
FIG. 15 is a bottom view showing the dust removal device according to the second embodiment of the present invention.

The dust removal device according to the second embodiment of the present invention is configured as shown in FIG. 14 and FIG. 15. The dust removal device according to the second embodiment differs from the dust removal device according to the first embodiment (see FIG. 4 to FIG. 13) on the point that the guide plate 17 is omitted, the point that the second discharge outlet constituted by a plurality of small holes arranged on one straight line is directly formed at the supply pipe 16, and the point that the surface of the supply pipe 16 at which the second discharge outlet 35 is formed is exposed from the surface of the head block 11a of the dedusting head 11 facing the conveyance roller 15.

In this dust removal device, in the same way as the first embodiment, it is possible to reliably dedust mainly the sheet body 100a of the sheet-shaped object 100 by air relatively strongly discharged from the first discharge outlet 30 and comparatively strong air suction through the front side first suction inlet 31 and rear side first suction inlet 32. On the other hand, the edge portion 100b of the sheet-shaped object 100, unlike the sheet body 100a, is subjected to air discharge and suction at a strength appropriate for the form of the edge portion 100b (form in which tabs 101 (protruding parts) are arranged), specifically comparatively weak air discharge from the second discharge outlet 35 formed at the portion of the supply pipe 16 exposed from the surface of the head block 11a and comparatively weak air suction through the front side second suction inlet 33 and rear side second suction inlet 34 formed on the surface of the head block 11a. Due to this, the edge portion 100b of the sheet-shaped object 100 can be properly dedusted without the tabs 101 of the edge portion 100b of the sheet-shaped object 100 flapping, bending, or being sucked into the suction inlets.

Further, the supply pipe 16 is capable of being turned about the direction it extends in when inserted in the head block 11a. By turning the supply pipe 16, the direction of air discharged from the second suction inlet 35 can be adjusted. By this adjustment, air can be blown from a direction appropriate for normal dedusting to the edge portion 100b (continuous tabs 101) of the sheet-shaped object 100.

Figure 16:
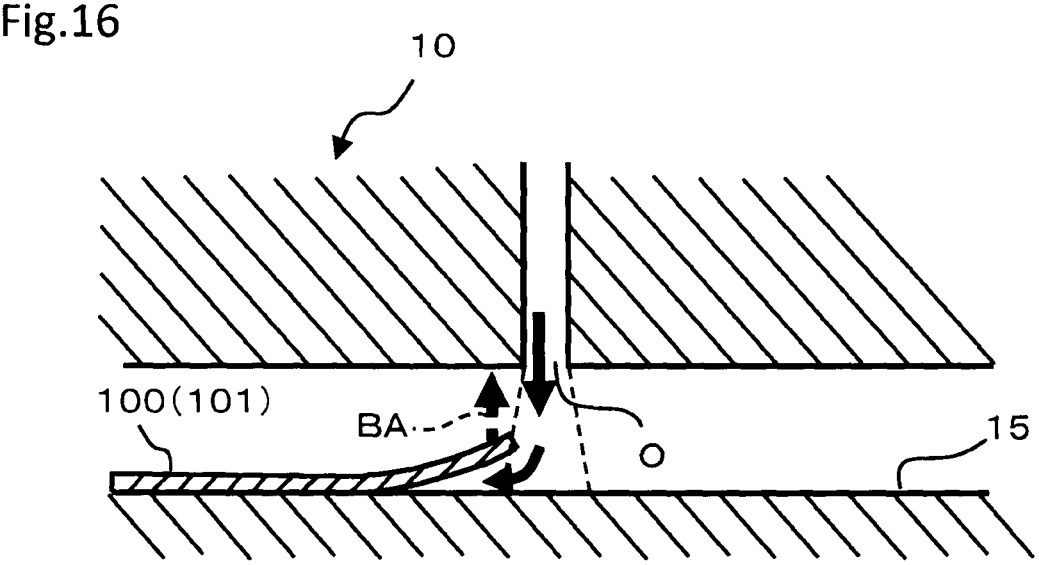
FIG. 16 is a view showing the principle behind how the sheet-shaped object (tabs) flips up due to air discharged from the discharge outlet.

In this regard, as shown in FIG. 16, the high speed flow of air discharged from the discharge outlet O (opening) of the dust removal device 10 (see the solid arrow in FIG. 16) causes the static pressure of the region along the flow to fall and enables a negative pressure BA to be obtained (Bernoulli effect). If a negative pressure BA is produced in the region along the flow of discharged air in this way, when the tabs 101 of the edge portion 100b of the sheet-shaped object 100 being conveyed by the conveyance roller enter the region facing the discharge outlet O, the front end portions of the tabs 101 end up being lifted up by the negative pressure BA. If the front end portions of the tabs 101 are lifted up even slightly in this way, the discharged air will enter the gaps causing the tabs 101 to suddenly flip up. As a result, the edge portion 100b (tabs 101) of the sheet-shaped object 100 cannot be appropriately dedusted.

A dust removal device according to a third embodiment of the present invention, in consideration of these circumstances, is configured so that the tabs 101 (edge portion 100b) of the sheet-shaped object 100 being conveyed are kept from flipping up due to the negative pressure caused by the above-described Bernoulli effect.

Figure 17:
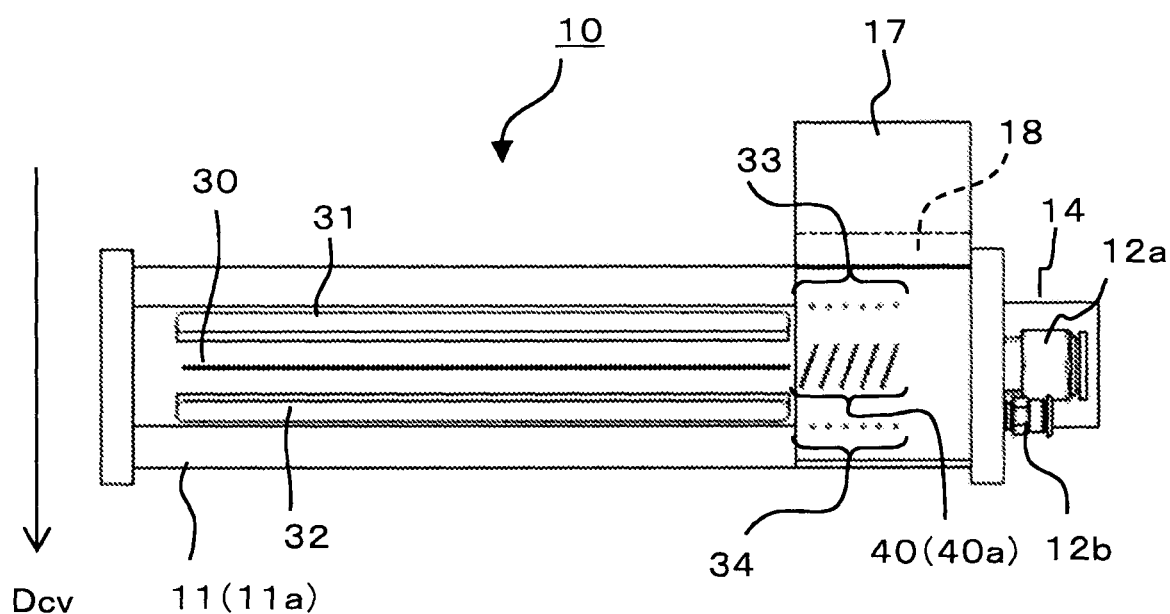
FIG. 17 is a bottom view showing a dust removal device according to a third embodiment of the present invention.
Figure 18:
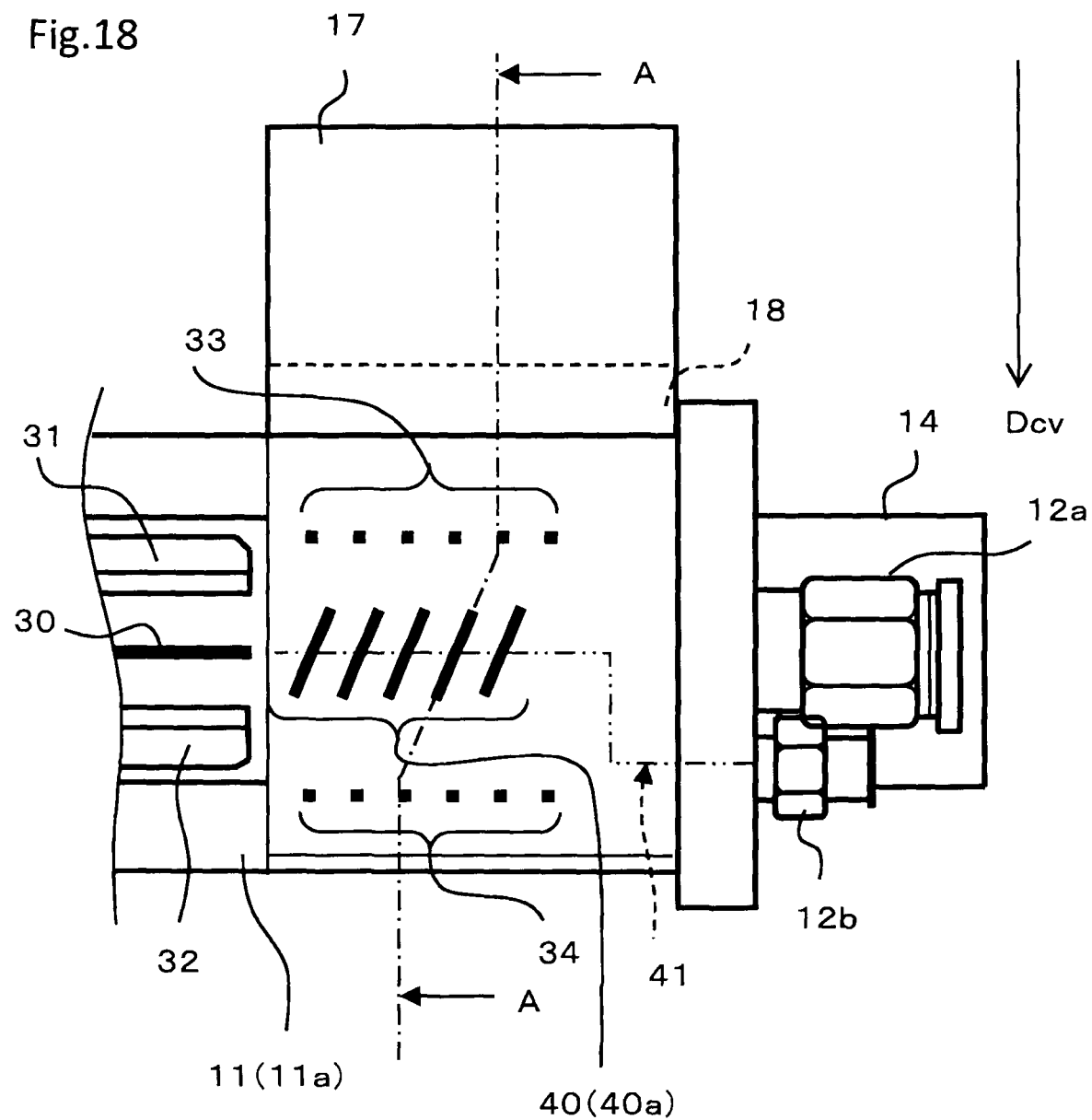
FIG. 18 is a partially cutaway bottom view showing partially enlarged the dust removal device according to the third embodiment of the present invention.
Figure 19:
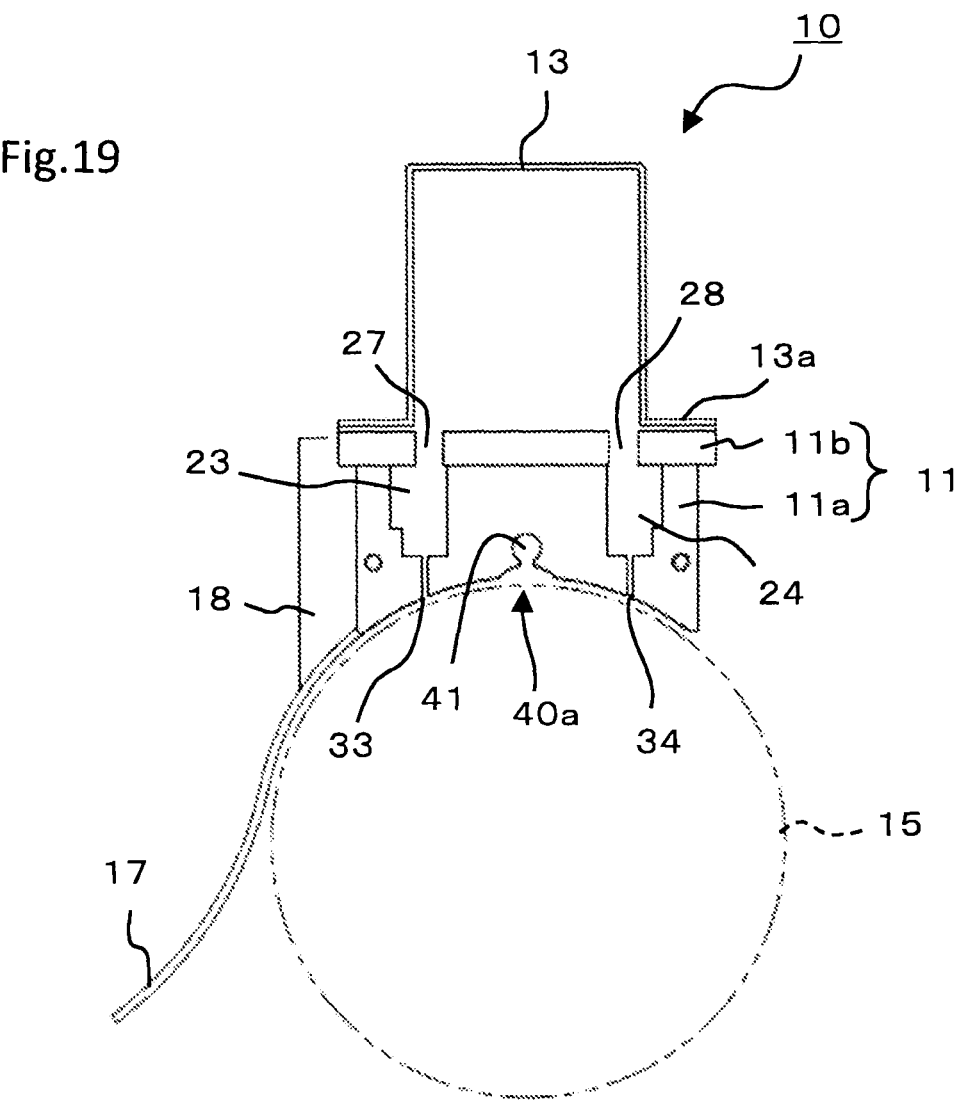
FIG. 19 is a cross-sectional view showing a cross-section of the dust removal device taken along the A-A line in FIG. 18.

The dust removal device according to the third embodiment of the present invention 10 is configured as shown in FIG. 17 to FIG. 19. FIG. 17 is a bottom view showing the dust removal device, FIG. 18 is a partially cutaway bottom view showing partially enlarged the dust removal device, and FIG. 19 is a cross-sectional view showing a cross-section of the dust removal device taken along the A-A line in FIG. 18. The dust removal device according to the third embodiment differs from the dust removal device according to the first embodiment on the point that the second discharge outlet 40 is constituted by a plurality of slits 40a (see FIG. 4 to FIG. 13), and the structure for supplying high pressure air to the plurality of slits 40a of the second discharge outlet 40 and the structure for fixing the guide plate 17 to the dedusting head 11 differ from those of the dust removal device according to the first embodiment.

In FIG. 17 and FIG. 18, at the surface of the dedusting head 11 (head block 11a) facing the conveyance roller 15 (sheet-shaped object 100 (tabs 101)), in the same way as the dust removal device according to the first embodiment (see FIGS. 10 and 15), a first discharge outlet 30, front side first suction inlet 31, and rear side first suction inlet 32 which extend in the longitudinal direction are formed. A first supply port 12a and a second supply port 12b are formed in the dedusting head 11 (head block 11a). High pressure air introduced through the first supply port 12a to the dedusting head 11 (head block 11a) is, in the same way as the dust removal device 10 according to the first embodiment (see FIG. 11), discharged from the first discharge outlet 30. Further, in the same way as the dust removal device 10 according to the first embodiment, along with air of the exhaust duct unit 13 being discharged to the outside through the exhaust port 14, air is drawn in through the front side first suction inlet 31 and the rear side first suction inlet 32.

In the dust removal device according to the third embodiment 10, in particular, at the surface of the dedusting head 11 (head block 11a) facing the conveyance roller 15, the second discharge outlet 40 constituted by a plurality of slits 40a is formed aligned with the first discharge outlet 30 in the direction it extends. The plurality of slits 40a constituting the second discharge outlet 40 are arranged at predetermined intervals in the longitudinal direction of the dedusting head 11 of a direction traversing the conveyance direction Dcv of the sheet-shaped object 100 (direction perpendicular to the conveyance direction Dcv). Further, each of the plurality of slits 40a extends in a direction traversing the direction of arrangement (longitudinal direction of the dedusting head 11 of the width direction of the sheet-shaped object 100) and inclines obliquely to the conveyance direction Dcv of the sheet-shaped object 100. Further, from the second supply port 12b, as shown enlarged in FIG. 18, a supply path 41 extends inside the dedusting head 11 (head block 11a) toward each of the plurality of slits 40a of the second discharge outlet 40. In addition, high pressure air introduced from the second supply port 12b passes through the supply path 41 and is discharged from each of the plurality of slits 40a of the second discharge outlet 40 (details will be explained later).

Further, as shown in FIG. 19 along with FIG. 17 and FIG. 18, in the dedusting head 11, the guide plate 17 is fixed by a fixation block 18. The guide plate 17 presses down the tabs 101 (edge portion 100b) of the sheet-shaped object 100 being conveyed by the rotating conveyance roller 15 toward the conveyance roller 15 side and guides them along the conveyance roller 15.

As shown in FIG. 19, the front side second suction inlet 33 constituted by a plurality of small holes communicates with the exhaust duct unit 13 through the front side second air suction chamber 23 and front side suction regulating holes 27 of the dedusting head 11. Further, the rear side second suction inlet 34 constituted by a plurality of small holes communicates with the exhaust duct unit 13 through the rear side second air suction chamber 24 and rear side suction regulating holes 28 of the dedusting head 11. Due to this, along with air of the exhaust duct unit 13 being discharged to the outside through the exhaust port 14, air is drawn in through the front side second suction inlet 33 and rear side second suction inlet 34.

Figure 20:
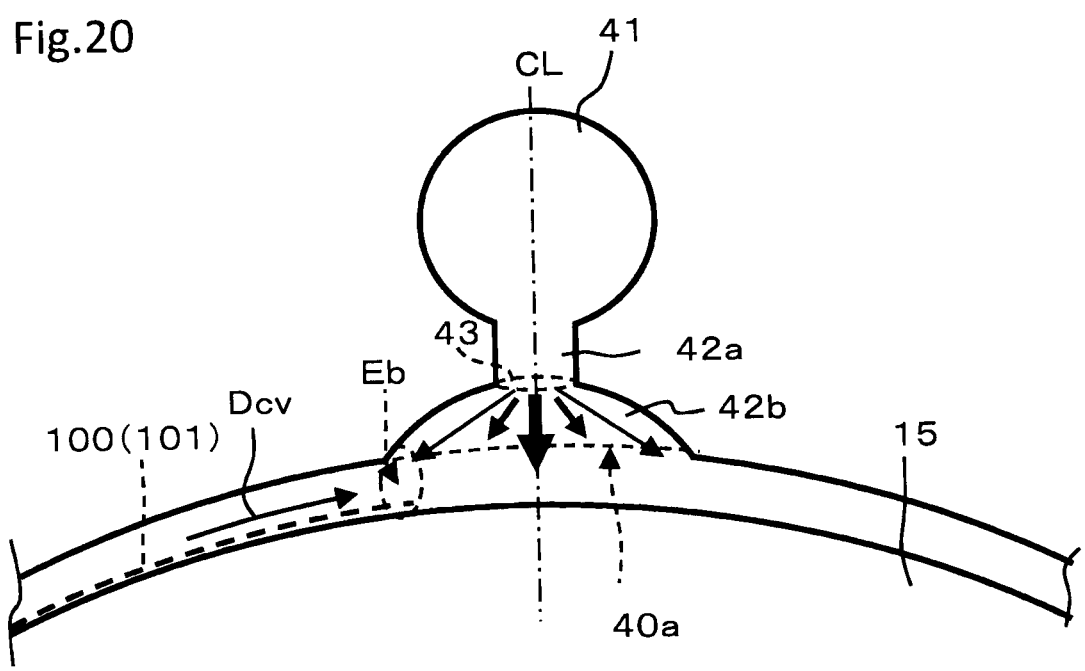
FIG. 20 is a cross-sectional view showing enlarged a gas discharge path to a second discharge outlet (slit).

Further, each of the plurality of slits 40*a* constituting the second discharge outlet 40 communicates with the supply path 41. In more detail, as shown in FIG. 20, a connecting path 42*a* extending from the supply path 41 connects through an opening 43 to a gas discharge path 42*b* leading to each slit 40*a*. A cross-section of the gas discharge path 42*b* taken vertical to the slit 40*a* (the cross-section shown in FIG. 20 taken along the A-A line in FIG. 18) has a shape which gradually expands from the opening 43 to the slit 40*a*, specifically, a shape that expands gradually to in an arc shape.

In the above-described dust removal device according to the third embodiment 10, in the same way as the first embodiment, it is possible to reliably dedust mainly the sheet body 100*a* of the sheet-shaped object 100 using air discharged in a relatively strong manner from the first discharge outlet 30 and comparatively strong suction of air through the front side first suction inlet 31 and rear side first suction inlet 32. On the other hand, the edge portion 100*b* (tabs 101) of the sheet-shaped object 100 is dedusted by air discharge from the plurality of slits 40*a* of the second discharge outlet 40 and air suction through the front side second suction inlet 33 and rear side second suction inlet 34.

The dedusting of the edge portion 100*b* (tabs 101) of the sheet-shaped object 100 will be explained in further detail.

Figure 21:
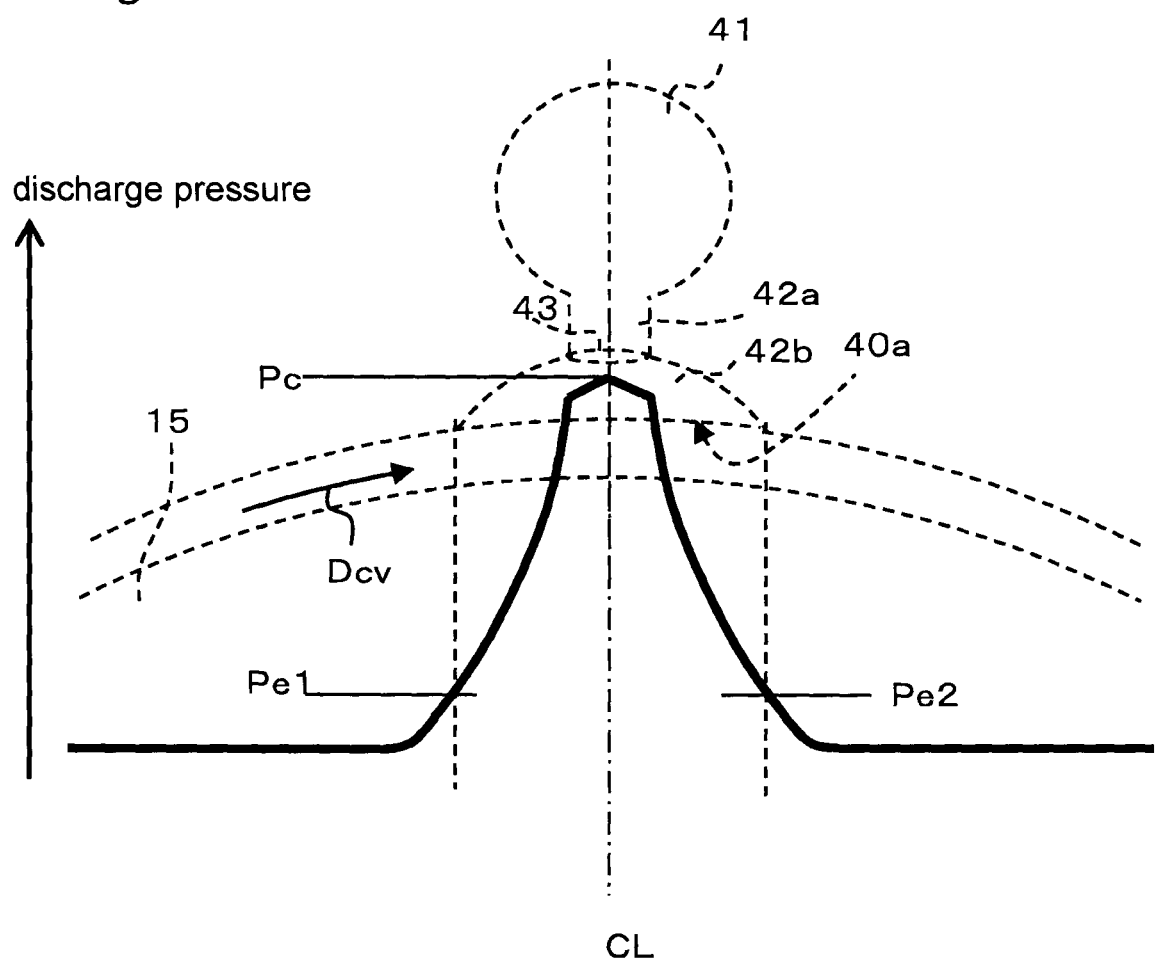
FIG. 21 is a line graph showing the discharge pressure of air discharged from the second discharge outlet (slit).

High pressure air running from the supply path 41 through the connecting path 42*a*, as shown in FIG. 20, runs through the gas discharge path 42*b* which gradually expand from the opening 43 and is discharged from the slit 40*a*. The discharge pressure of air discharged from the slit 40*a* is distributed in the manner shown in FIG. 21. That is, the discharge pressure Pe1 of air running from the openings 43 along the inner peripheral walls of the gas discharge path 42*b* and discharged from the upstream end part of the slit 40*a* in the conveyance direction Dcv of the sheet-shaped object 100 (tabs 101) being conveyed is lower than the discharge pressure Pc of air directly discharged from the portion of the slit 40*a* facing the opening 43 without running along the inner peripheral wall of the gas discharge paths 42*b*. Due to this, the pressure Pc of air discharged from the portions of the slit 40*a* facing the opening 43 is kept at a desired pressure (lower than the discharge pressure from the first discharge outlet 30) while the discharge pressure Pe1 of air discharged from the upstream end part of the slit 40*a* decreases.

Due to the discharge pressure Pe1 of air discharged from the upstream end part of the slit decreasing in this way, a negative pressure state caused by the Bernoulli effect becomes more difficult to produce at a region Eb facing the upstream end parts of the slit 40*a*. Therefore, the tabs 101 of the sheet-shaped object 100 being conveyed are kept from flipping up due to a negative pressure state which could be produced by the Bernoulli effect when entering the region Eb facing the upstream end part of the slit 40*a*, while dust sticking to the tabs 101 is reliably removed by air of the desired discharge pressure Pc discharged from the portion of the slit 40*a* facing the opening 43.

Note that the discharge pressure Pe2 of air discharged from the downstream end part of the slit 40*a* (see FIG. 21) also decreases in the same way. The tabs 101 of the sheet-shaped object 100 being conveyed are able to exit stably from a region facing the downstream end part of the slit without flapping.

Further, in the above-described dust removal device 10, when the tabs 101 of the sheet-shaped object 100 being conveyed enter the region Eb facing the upstream end parts of the plurality of slits 40*a*, air of a certain discharge pressure Pe1 is blown to the tabs 101 discretely from the plurality of slits 40*a*. For this reason, when the tabs 101 of the sheet-shaped object 100 enter the region Eb facing the upstream end parts of the plurality of slits 40*a*, discharged air will not act simultaneously on all of the front end portions of the tabs 101. Accordingly, the tabs 101 can be reliably kept from flipping up due to air acting on the front end portions of the tabs 101 and in a state in which air of the desired discharge pressure Pc is discharged from the portions of the slits 40*a* facing the openings 43.

Further, the plurality of slits 40*a* constituting the second discharge outlet 40 incline obliquely to the conveyance direction Dcv of the sheet-shaped object 100 (tabs 101), so when the tabs 101 of the sheet-shaped object 100 pass through the region facing the slits 40*a*, the gas can be blown over a wider range on the tabs 101 from the discretely arranged plurality of slits 40*a*.

Figure 22:
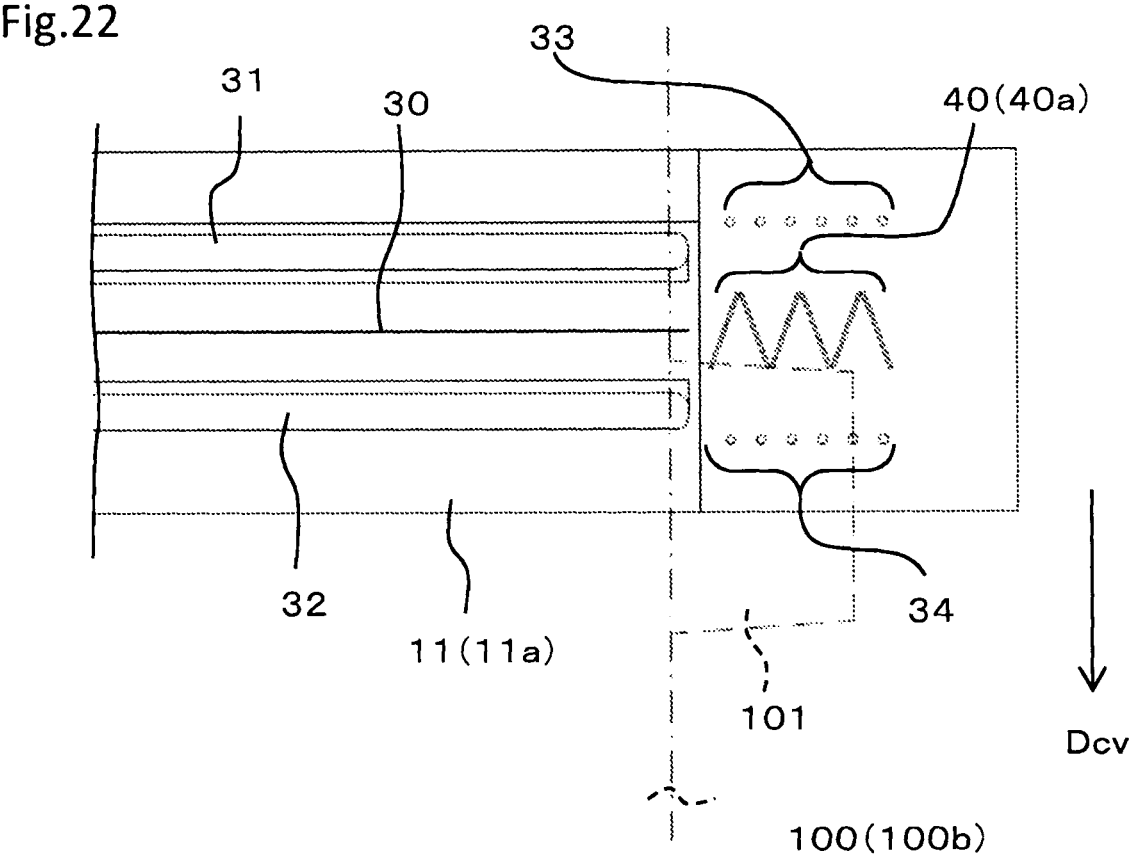
FIG. 22 is a bottom view showing a modification of the dust removal device according to the third embodiment.

Note that the arrangement of the plurality of slits 40*a* constituting the second discharge outlet 40 is not limited to the one described above (see FIG. 17 and FIG. 18). For example, as shown in FIG. 22, the plurality of slits 40*a* may be arranged zig-zag in the width direction of the sheet-shaped object 100 (tabs 101) being conveyed, that is, a direction traversing the conveyance direction of the sheet-shaped object 100 (perpendicular direction).

Figure 23:
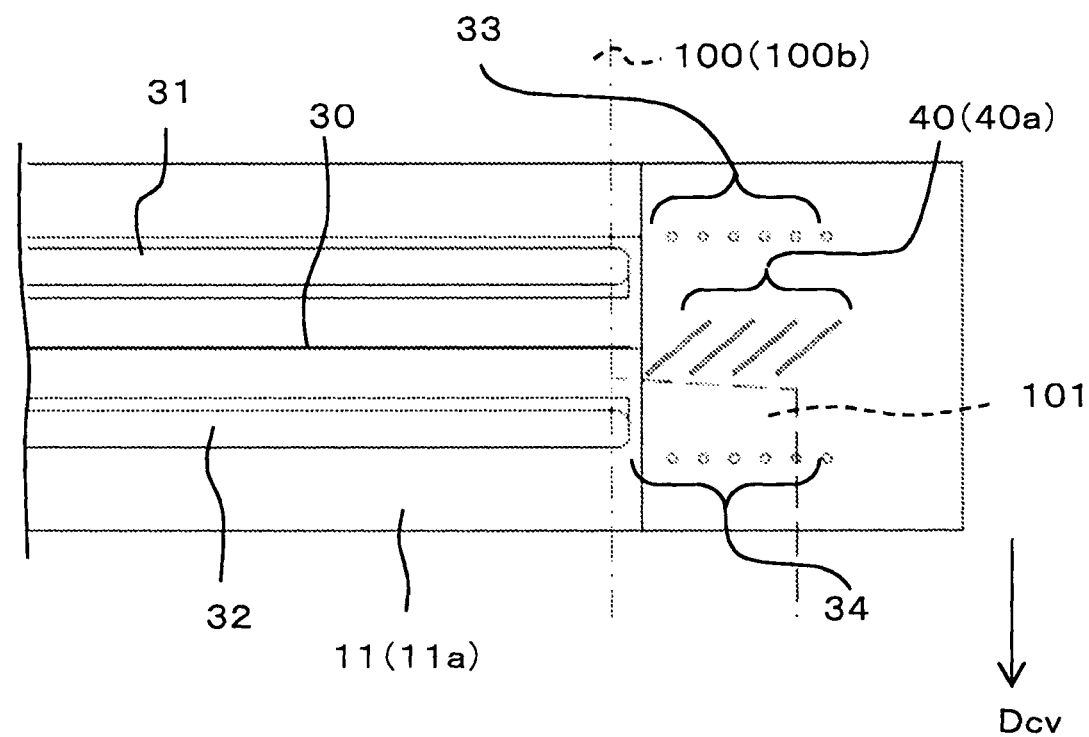
FIG. 23 is a bottom view showing another modification of the dust removal device according to the third embodiment.

Further, as shown in FIG. 23, each of the plurality of slits 40*a* constituting the second discharge outlet 40 can also be formed in a state overlapping adjacent slit 40*a* in view in the conveyance direction Dcv of the sheet-shaped object 100 (tabs 101). In this case, the gas can be blown with no gaps to the sheet-shaped object 100 (tabs 101) from the discretely arranged plurality of slits 40*a* during conveyance of the sheet-shaped object 100. As a result, the surface of the sheet-shaped object 100 (tabs 101) can be reliably dedusted.

Figure 24:
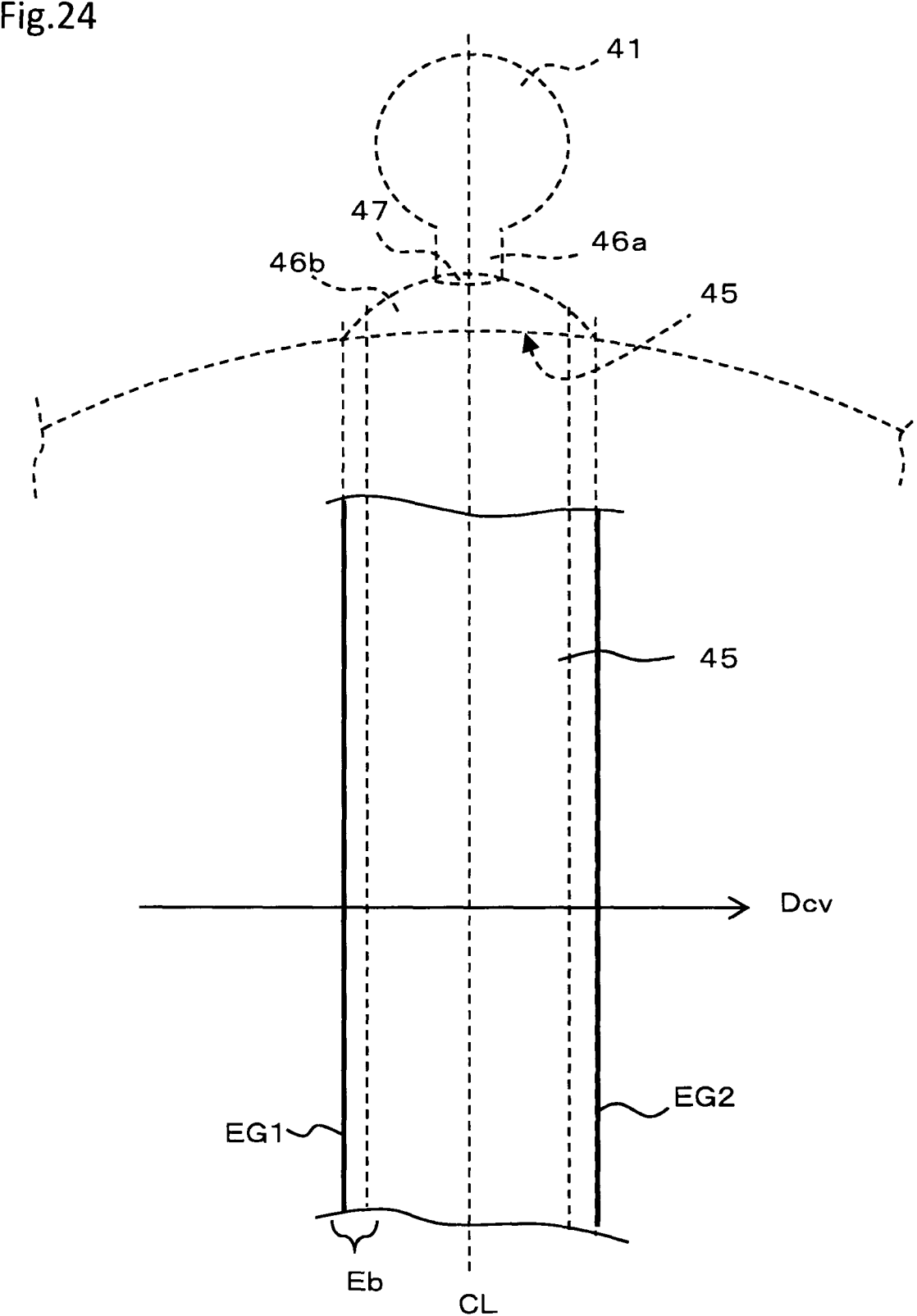
FIG. 24 is a view showing a modification of the second discharge outlet.

Further, the configuration (shape) of the second discharge outlet 40 is not limited to the above-described plurality of slits 40*a*. For example, as shown in FIG. 24, the second discharge outlet can be formed as an elongated hole 45 extending in a direction traversing the conveyance direction Dcv of the sheet-shaped object 100 (tabs 101) (for example, perpendicular direction), that is, in the width direction of the dedusting head 11. In addition, in the dedusting head 11, the connecting path 46*a* extending from the supply path 41 connects through the opening 47 to a gas discharge path 46*b* leading to the elongated hole A cross-section of the gas discharge path 46*b* taken vertical to the elongated hole 45 (shown by the broken line in FIG. 24), in the same way as that described earlier (see FIG. 20), has a shape which gradually expands from the opening 47 to the elongated hole 45, specifically, a shape which gradually expands to in an arc shape.

In a dust removal device 10 in which the second discharge outlet is constituted by an elongated hole 45 in this way, in the same way as described earlier, the discharge pressure of air running from the opening 47 along the inner peripheral wall of the gas discharge path 46*b* and discharged from the upstream end part EG1 of the elongated hole 45 in the conveyance direction Dcv of the sheet-shaped object 100 (tabs 101) being conveyed becomes lower than the discharge pressure of air directly discharged from the portion of the elongated hole 45a facing the opening 47 without running along the inner peripheral wall of the gas discharge path 46b. Due to this, the pressure of air discharged from the portion of the elongated hole 45 facing the opening 47 can be kept at a desired pressure (lower than the discharge pressure from the first discharge outlet 30) while lowering the discharge pressure of air discharged from the upstream end part EG1 of the elongated hole 45.

Due to the discharge pressure of the gas discharged from the upstream end part EG1 of the elongated hole 45 (second discharge outlet) decreasing in this way, a negative pressure state caused by the Bernoulli effect becomes difficult to occur at a region Eb facing the upstream end part EG1 of the elongated hole 45 in the same way in the configuration described earlier. Therefore, the tabs 101 of the sheet-shaped object 100 being conveyed can be kept from flipping up due to a negative pressure state which can be produced by the Bernoulli effect when entering the region Eb facing the upstream end part EG1 of the elongated hole 45, while dust sticking to the tabs 101 of the sheet-shaped object 100 being conveyed is reliably removed by the gas of the desired discharge pressure discharged from the portion of the elongated hole (second discharge outlet) facing the opening 47. Note that the discharge pressure of air discharged from the downstream end part EG2 of the elongated hole also decreases in the same way and the tabs 101 of the sheet-shaped object 100 being conveyed are able to exit stably from the region facing the downstream end part EG2 of the elongated hole 45 without flapping.

Further, note that if the second discharge outlet is constituted by an elongated hole 45 such as shown in FIG. 24, unlike if the second discharge outlet 40 is constituted by a plurality of slits (see FIG. 17 to FIG. 20), air discharged from the elongated hole 45 acts simultaneously on all of the front end portions of the tabs 101 of the sheet-shaped object 100 being conveyed when the tabs 101 enter the region Eb facing the upstream end part EG1 of the elongated hole 45. Accordingly, considering this, it is necessary to adjust the discharge pressure of air discharged from the elongated hole 45 (discharge pressure of gas from the opening 47).

Note that the support part for supporting the sheet-shaped object 100 is not limited to a conveyance roller 15, 55. So long as it is something that the sheet-shaped object 100 being conveyed will contact, it may have a flat shape or may be one having a curved shape other than a cylindrical curve like that of the conveyance roller 15, 55. Further, the dust removal device 100 need not be not arranged facing the support part supporting the sheet-shaped object 100 and may be arranged facing a surface portion of the sheet-shaped object 100 not particularly supported by the support part.

Further, the sheet-shaped object to be dedusted may be a sheet-shaped object dispensed from a roll or an unrolled sheet-shaped object.

Further, the sheet-shaped object to be dedusted need only be one that is thin and wide enough to be influenced by the air flow through the discharge outlets and suction inlets and is not limited to a so-called sheet shape. Not only that, it may also be one called a film shape such as an electrode film used in the earlier described production of a secondary battery or may be one called a membrane shape.

Above, embodiments of the present invention were explained, but these embodiments and modifications of parts were presented only as examples and are not intended to limit the scope of the invention. The new embodiments described above can be carried out in other various modes and can be subjected to various omissions, substitutions, or changes within a range that does not depart from the gist of the invention. These embodiments and modifications are encompassed by the scope and gist of the invention and by the inventions set forth in the claims

INDUSTRIAL APPLICABILITY

The dust removal device and dust removal method according to the present invention have the effect of being able to properly dedust the surface of a sheet-shaped object having an edge portion of a shape with protruding parts (tabs) continuously arranged at certain intervals along the longitudinal direction and are useful as a dust removal device and dust removal method for discharging a gas to the surface of the sheet-shaped object to be conveyed while drawing the gas above the surface of the sheet-shaped object so as to remove dust from the surface of the sheet-shaped object.

REFERENCE SIGNS LIST 10 dust removal device
11 dedusting head
11a head block
11b suction regulating plate
12 supply port
12a first air supply port
12b second suction port
13 exhaust duct unit
13a flange
14 exhaust port
15 conveyance roller
16 supply pipe
17 guide plate
18 guide fixation block
20 ejection chamber
21 front side first air suction chamber
22 rear side first air suction chamber
23 front side second air suction chamber
24 rear side second air suction chamber
25 front side first suction regulating hole
26 rear side first suction regulating hole
27 front side second suction regulating hole
28 rear side second suction regulating hole
30 first discharge outlet
31 front side first suction inlet
32 rear side first suction inlet
33 front side second suction inlet
34 rear side second suction inlet
35 second discharge outlet
40 second discharge outlet
40a slit
41 supply path
42a, 46a connecting path
42b, 46b gas discharge path
43, 47 opening
45 elongated hole
100 sheet-shaped object
100a sheet body
100b edge portion
101 tabs (protruding part)

The invention claimed is:

1. A dust removal device that dusts a sheet-shaped object having an edge portion with a shape with protruding parts continuously arranged at certain intervals in the longitudinal direction and is provided with a discharge outlet and suction inlet facing the surface of the sheet-shaped object being conveyed and arranged at a predetermined interval along the conveyance direction of the sheet-shaped object and that discharges a gas from the discharge outlet to the surface of the sheet-shaped object while drawing in the gas above the surface of the sheet-shaped object through the suction inlet, wherein the discharge outlet includes a first discharge outlet which discharges the gas to a portion of the sheet-shaped object other than an edge portion in the width direction and a second discharge outlet which is separated from the first discharge outlet and discharges the gas to the edge portion of the sheet-shaped object more weakly than the first discharge outlet discharges the gas, and the suction inlet includes a first suction inlet which draws in the gas above the surface of the portion of the sheet-shaped object other than the edge portion, and a second suction inlet which is separated from the first suction inlet and draws in the gas above the surface of the edge portion of the sheet-shaped object more weakly than the first suction inlet draws in the gas.

2. The dust removal device according to claim 1 wherein a supply path for the gas discharged from the first discharge outlet and a supply path for the gas discharged from the second discharge outlet differ.

3. The dust removal device according to claim 1 wherein the opening area per unit length of the second discharge outlet is smaller than the opening area per unit length of the first discharge outlet.

4. The dust removal device according to claim 3 wherein the second discharge outlet includes a plurality of small holes aligned in a direction traversing the conveyance direction of the sheet-shaped object.

5. The dust removal device according to claim 1 having a gas discharge path with a shape that gradually expands from an opening facing the sheet-shaped object being conveyed to the second discharge outlet.

6. The dust removal device according to claim 5 wherein a cross-section of the gas discharge path taken perpendicular to the sheet-shaped object being conveyed has a shape which gradually expands in an arc shape.

7. The dust removal device according to claim 1 wherein the second discharge outlet includes a plurality of slits which are arranged in a direction traversing the conveyance direction of the sheet-shaped object with each slit extending in a direction traversing the arrangement direction, and the dust removal device having a gas ejection path which is provided for each of the plurality of slits and extends from an opening facing the sheet-shaped object to the slit, and wherein a cross-section of the gas ejection path taken vertical to each slit has a shape which gradually expands from the opening to the slit.

8. The dust removal device according to claim 7 wherein the shape of the cross-section gradually expands in an arc shape.

9. The dust removal device according to claim 7 wherein each of the plurality of slits is formed inclining obliquely to the conveyance direction of the sheet-shaped object.

10. The dust removal device according to claim 9 wherein each of the plurality of slits is formed in a state overlapping the adjacent slit in view in the conveyance direction of the sheet-shaped object.

11. The dust removal device of claim 7 wherein the plurality of slits are arranged in parallel.

12. The dust removal device of claim 7 wherein the plurality of slits are arranged zig-zag in a direction traversing the conveyance direction of the sheet-shaped object.

13. The dust removal device of claim 1 wherein the opening area per unit length of the second suction inlet is lower than the opening area per unit length of the first suction inlet.

14. The dust removal device according to claim 13 wherein the second suction inlet includes a plurality of small holes aligned in a direction traversing the conveyance direction of the sheet-shaped object.

15. A dust removal method for dedusting a sheet-shaped object having an edge portion with a shape with protruding parts continuously arranged at certain intervals in the longitudinal direction, the method using a dust removal device according to claim 1 which is provided with the discharge outlet and the suction inlet arranged facing the surface of the sheet-shaped object being conveyed and extending in a direction traversing the conveyance direction of the sheet-shaped object at a predetermined interval in the conveyance direction of the sheet-shaped object, and the method comprising: a flow generation step of discharging a gas from the discharge outlets to the surface of the sheet-shaped object while drawing in a gas above the surface of the sheet-shaped object through the suction inlets, where, in the flow generation step, the discharge of the gas from the discharge outlets is weaker on the edge portion of the sheet-shaped object than portions of the sheet-shaped object other than the edge portion, and the suction of the gas through the suction inlets is weaker on the surface of the edge portion than on the surface of portions of the sheet-shaped object other than the edge portion.

16. The dust removal method according to claim 15 using the dust removal device according to claim 1 in which the discharge outlet includes the first discharge outlet for discharging the gas to portions of the sheet-shaped object other than the edge portion and the second discharge outlet for discharging the gas to the edge portion of the sheet-shaped object, and in which the suction inlet includes the first suction inlet which draws in the gas above the surface of portions of the sheet-shaped object other than the edge portion and the second suction inlet which draws in the gas above the surface of the edge portion of the sheet-shaped object, where, in the flow generation step, the discharge of the gas from the second discharge outlet is weaker than discharge of the gas from the first discharge outlet, and the suction of the gas by the second suction inlet is weaker than the suction of the gas by the first suction inlet.

* * * * *